United States Patent
Momoo et al.

(10) Patent No.: US 9,911,449 B2
(45) Date of Patent: Mar. 6, 2018

(54) RECORDER AND PLAYER APPARATUS STABLY KEEPING TRACK OF RECORDING MEDIUM

(71) Applicant: Panasonic Intellectual Property Management Co., Ltd., Osaka (JP)

(72) Inventors: Kazuo Momoo, Osaka (JP); Junichi Asada, Hyogo (JP); Yasushi Kobayashi, Osaka (JP); Kousei Sano, Osaka (JP); Yuichi Takahashi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/377,044

(22) Filed: Dec. 13, 2016

(65) Prior Publication Data
US 2017/0263280 A1 Sep. 14, 2017

(30) Foreign Application Priority Data
Mar. 9, 2016 (JP) .................................. 2016-045264

(51) Int. Cl.
*G11B 7/135* (2012.01)
*G11B 7/09* (2006.01)

(52) U.S. Cl.
CPC .................................. *G11B 7/0901* (2013.01)

(58) Field of Classification Search
None
See application file for complete search history.

(56) References Cited

U.S. PATENT DOCUMENTS

| 5,663,940 A * | 9/1997 | Horimai | G11B 7/0903 369/110.03 |
| 6,275,463 B1 * | 8/2001 | Nagata | G11B 7/0903 369/118 |
| 2002/0006091 A1 * | 1/2002 | Ma | G11B 7/0956 369/44.35 |
| 2002/0027843 A1 * | 3/2002 | Kim | G11B 7/0901 369/44.35 |

(Continued)

FOREIGN PATENT DOCUMENTS

JP  11-25482  1/1999

*Primary Examiner* — Peter Vincent Agustin
(74) *Attorney, Agent, or Firm* — Wenderoth, Lind & Ponack, L.L.P.

(57) ABSTRACT

The first, third, fourth, and seventh photosensors are disposed on one side with respect to the centerline, and the second, fifth, sixth, and eighth photosensors are disposed on another side with respect to the centerline. The first and seventh photosensors are positioned between the third and fourth photosensors in the direction parallel to the centerline. The second and eighth photosensors are positioned between the fifth and sixth photosensors in the direction parallel to the centerline. The first photosensor receives overlapped light of the 0th-order light with the +1st-order diffracted light, the second photosensor receives overlapped light of the 0th-order light with the −1st-order diffracted light, each of the third to sixth photosensors receives the 0th-order light, and does not receive the +1st-order diffracted light and the −1st-order diffracted light, and each of the seventh and eighth photosensors receives at least the 0th-order light.

14 Claims, 31 Drawing Sheets

(56) References Cited

U.S. PATENT DOCUMENTS

| | | | | |
|---|---|---|---|---|
| 2002/0159378 A1* | 10/2002 | Lee | ............... | G11B 7/131 369/112.12 |
| 2004/0032815 A1* | 2/2004 | Kim | ............... | G11B 7/09 369/112.26 |
| 2004/0246834 A1* | 12/2004 | Seong | ............... | G11B 7/0903 369/44.37 |
| 2005/0007638 A1* | 1/2005 | Ilmura | ............... | G11B 7/0053 358/484 |
| 2005/0036432 A1* | 2/2005 | Kim | ............... | G11B 7/133 369/112.16 |
| 2006/0209647 A1* | 9/2006 | Park | ............... | G11B 7/123 369/44.41 |
| 2006/0278807 A1* | 12/2006 | Nakao | ............... | G11B 7/0903 250/201.5 |
| 2007/0164241 A1* | 7/2007 | Nakano | ............... | G11B 7/0906 250/559.36 |
| 2009/0168618 A1* | 7/2009 | Yamazaki | ............... | G11B 7/0903 369/47.14 |
| 2010/0046340 A1* | 2/2010 | Nishiyama | ............... | G11B 7/0903 369/53.17 |
| 2010/0265809 A1* | 10/2010 | Kimura | ............... | G11B 7/0903 369/112.03 |

* cited by examiner

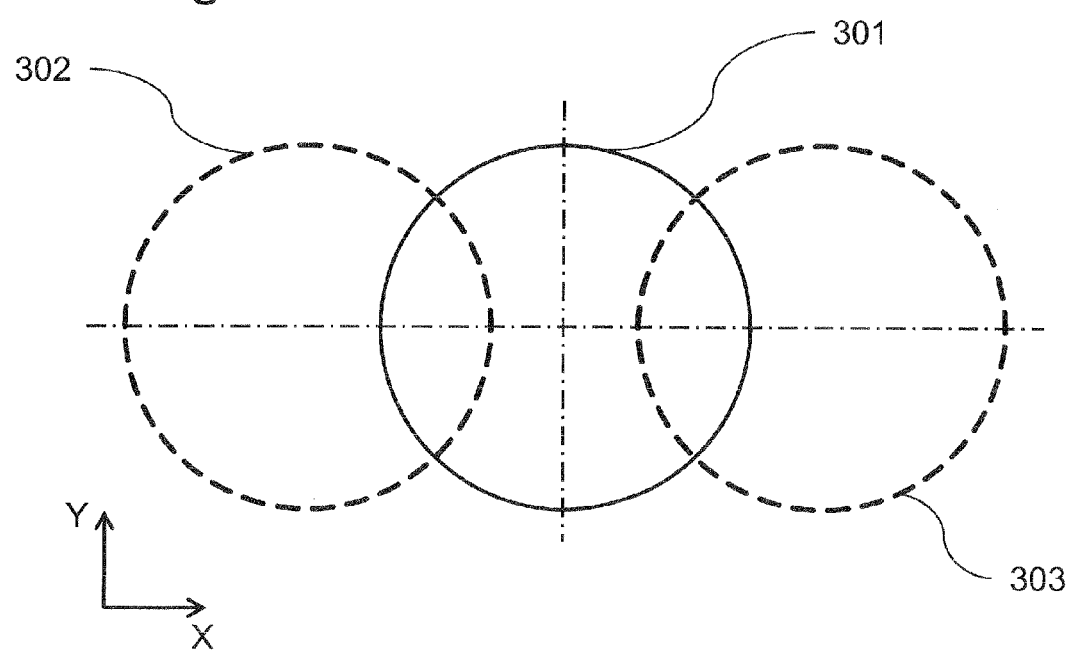

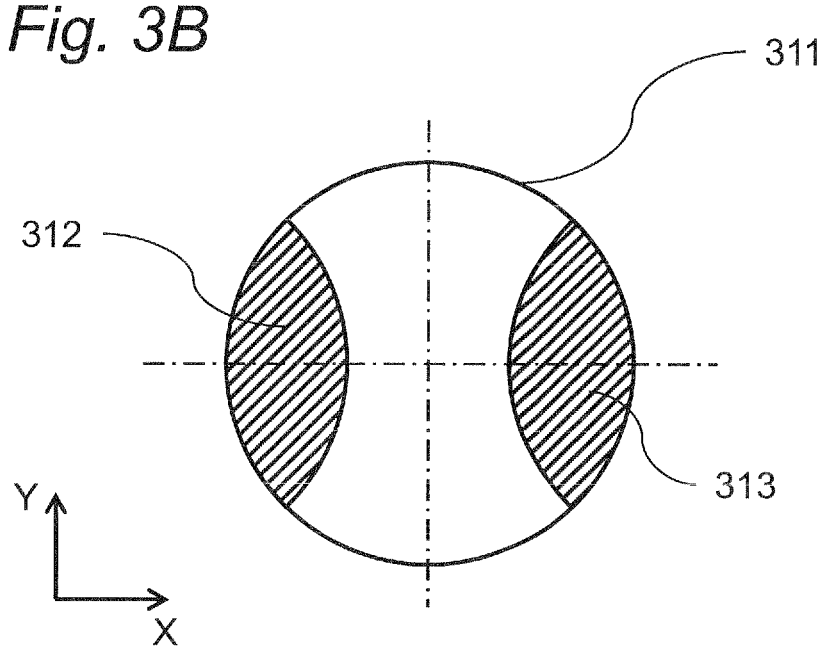

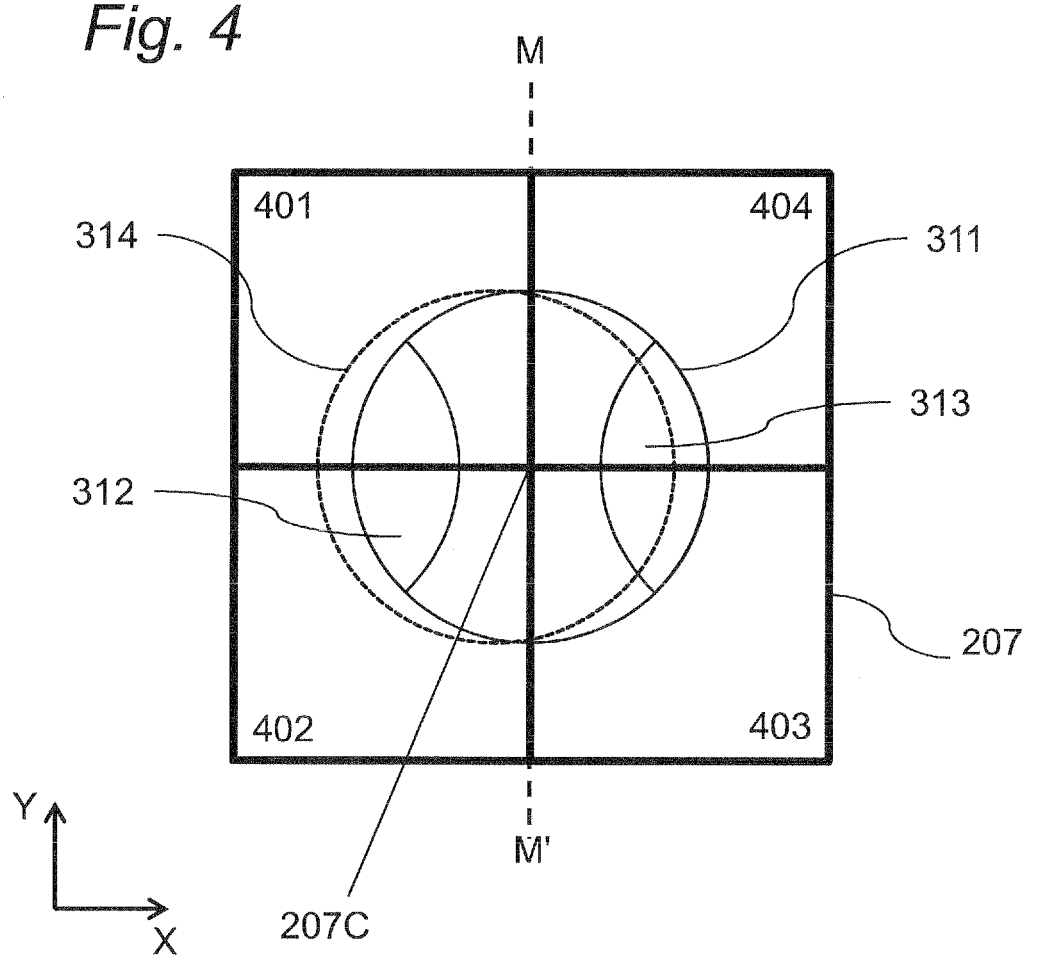

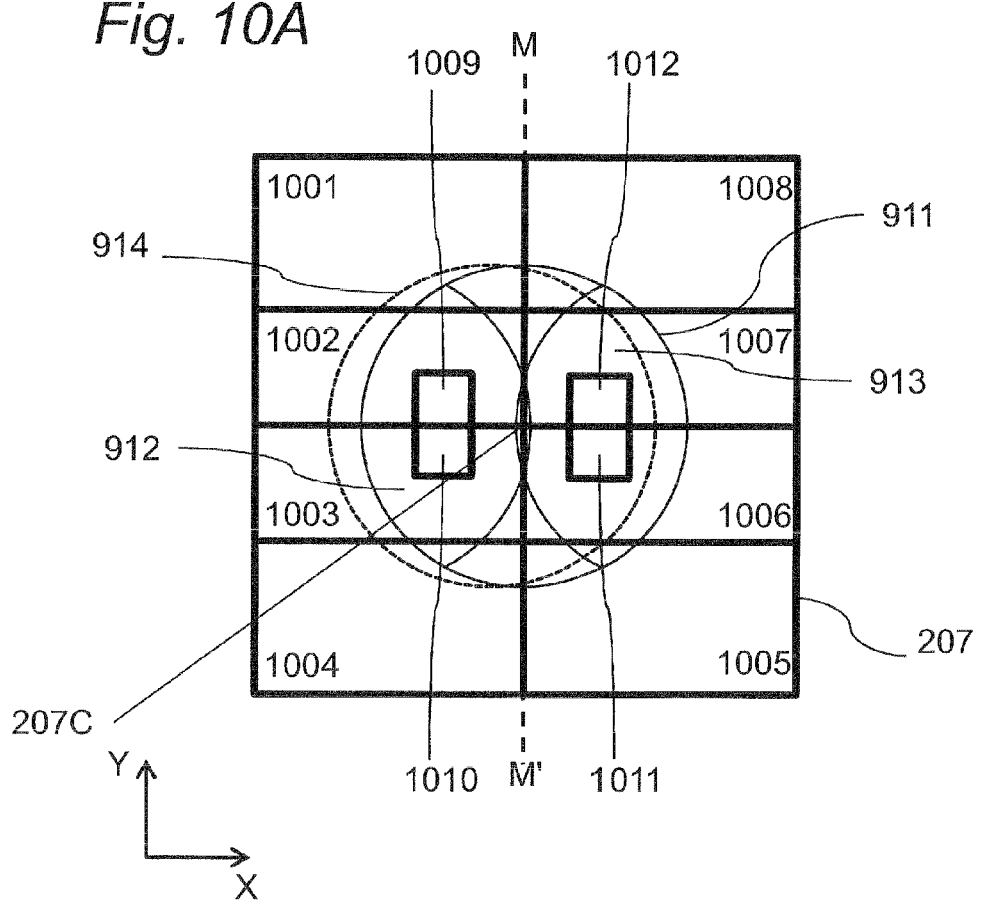

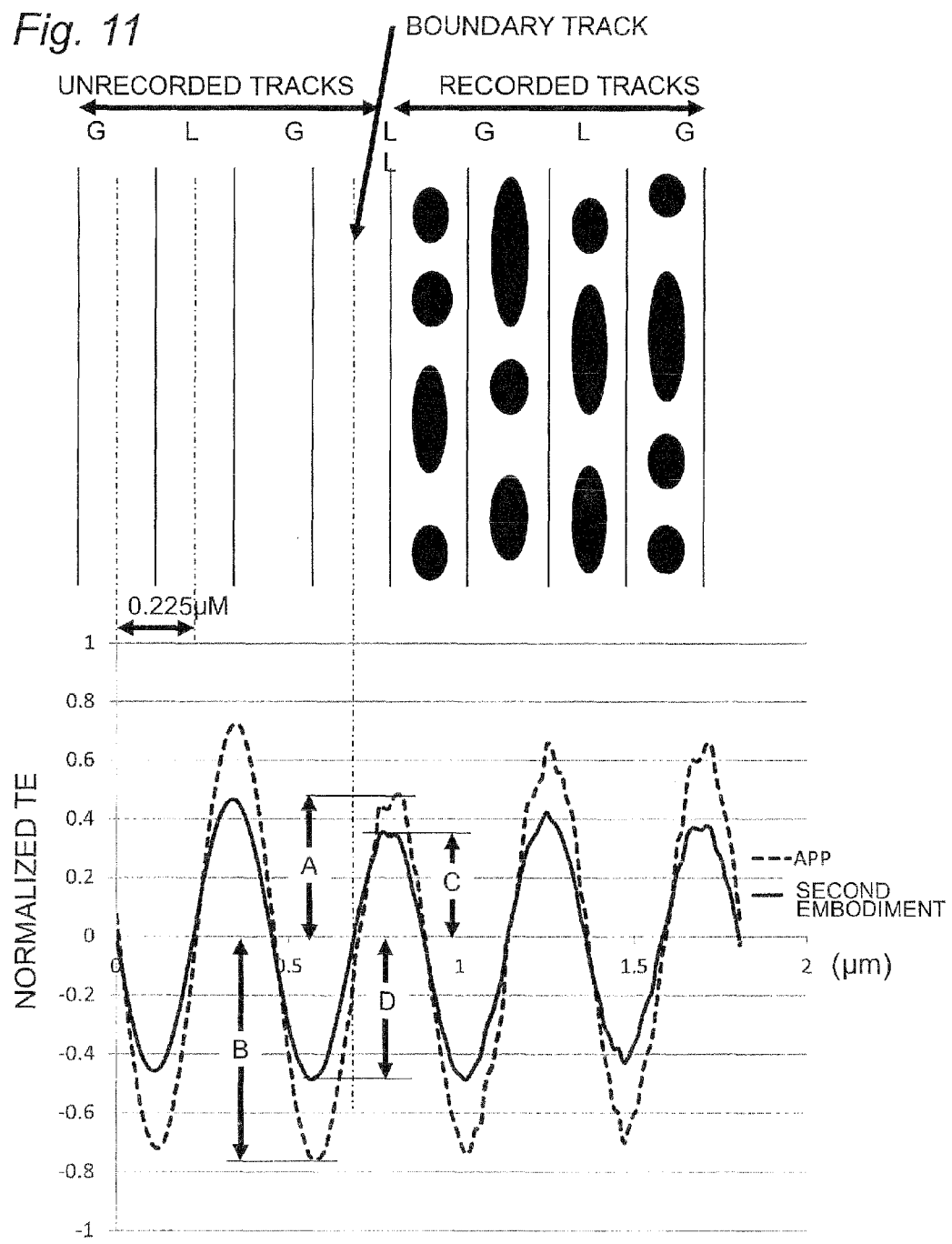

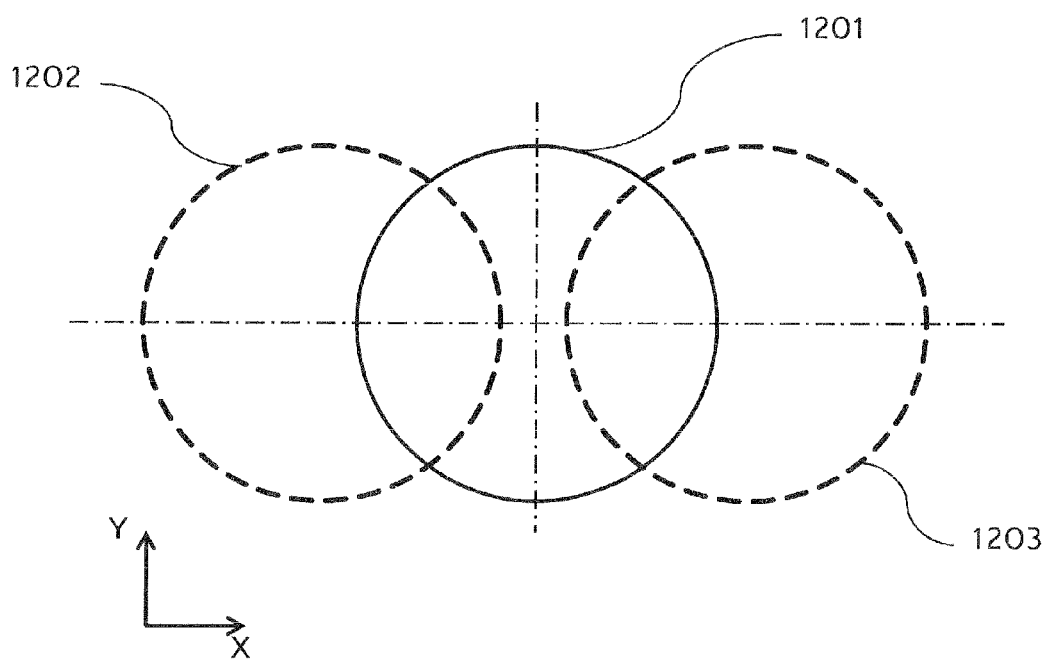

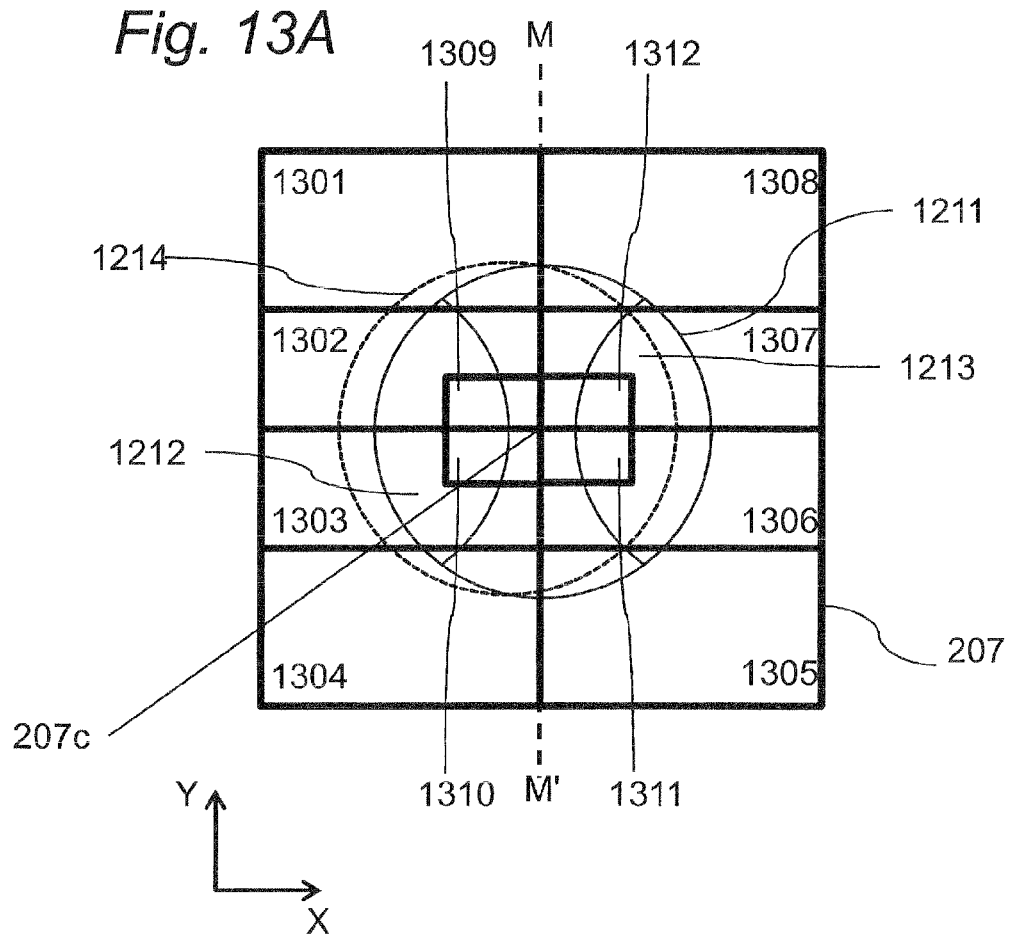

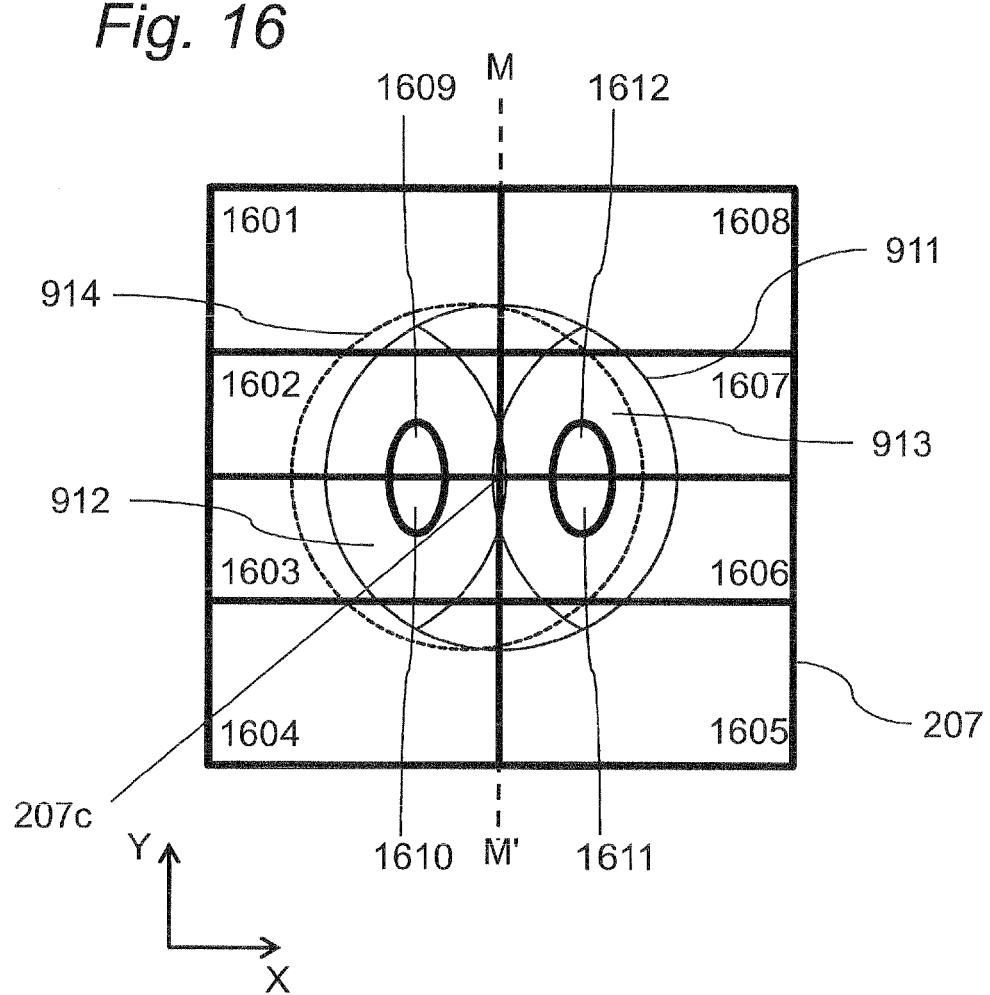

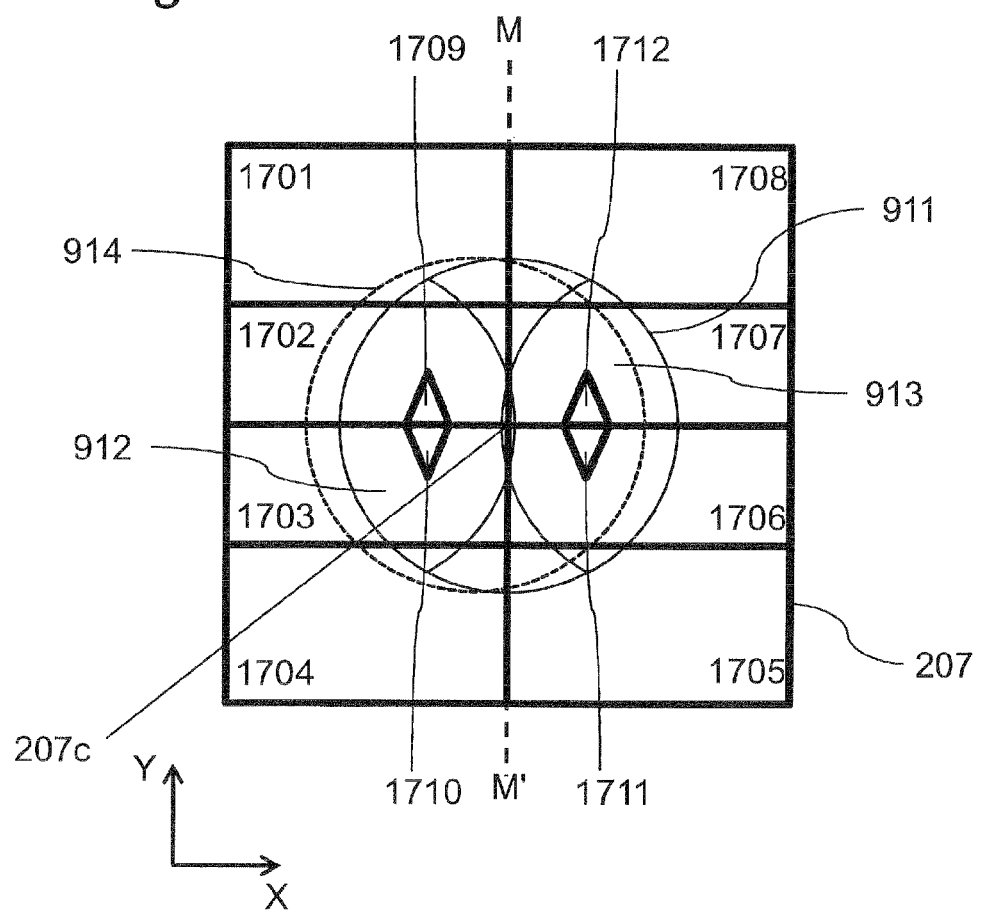

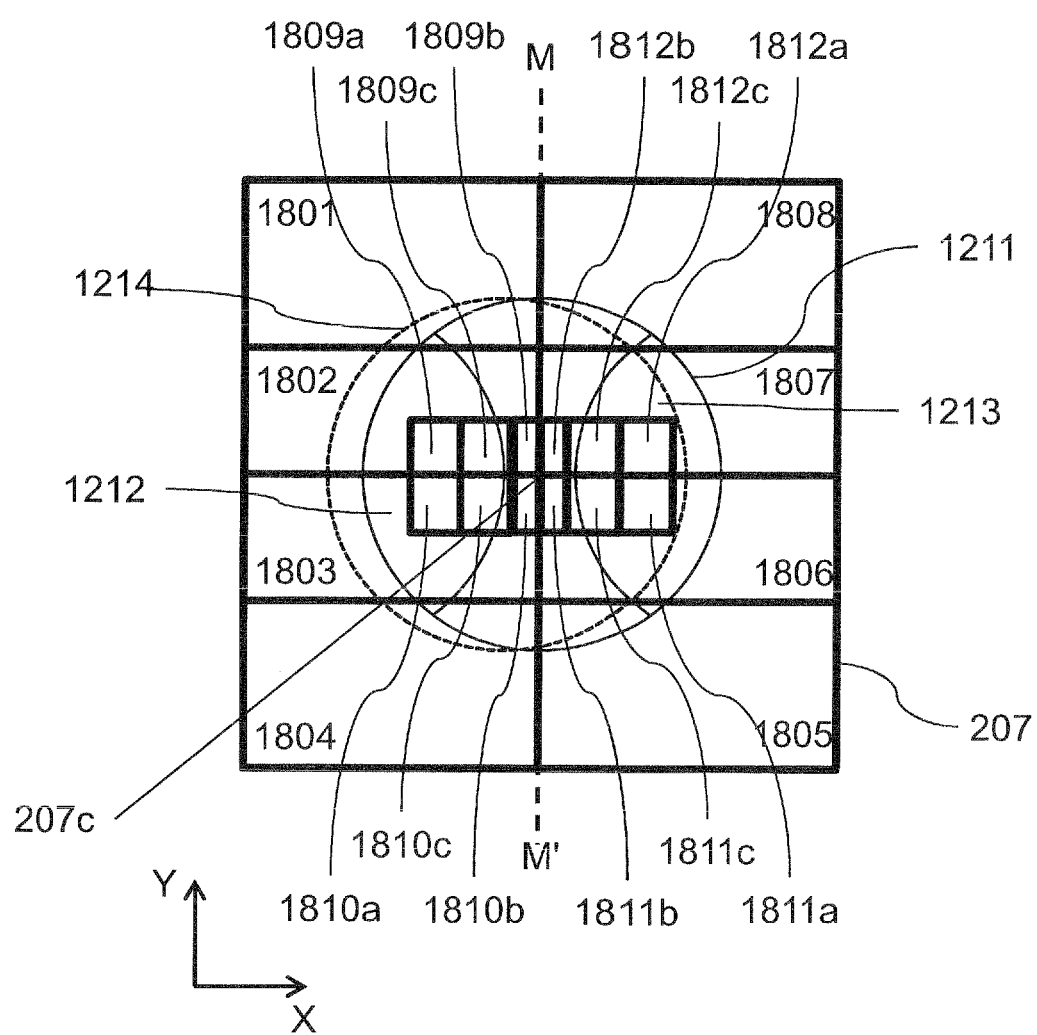

RECORDER AND PLAYER APPARATUS STABLY KEEPING TRACK OF RECORDING MEDIUM

BACKGROUND

1. Technical Field

The present disclosure relates to a recording and playing apparatus for optically writing and reading information on and from a recording medium.

2. Description of Related Art

Japanese Patent Laid-open Publication No. H11-025482 A discloses an optical disc drive apparatus capable of keeping track of a recording medium using the Advanced Push-Pull method (APP method). The optical disc drive apparatus uses the APP method to reduce a tracking offset caused by an object lens shift. Thus, it is possible to achieve stable tracking of the recording medium.

SUMMARY

One non-limiting and exemplary embodiment provides a recording and playing apparatus capable of more stably keeping track of the recording medium than the prior art, when optically writing and reading information on and from the recording medium.

A recording and playing apparatus according to one aspect of the present disclosure writes and reads information on and from a recording medium having a plurality of tracks disposed at a predetermined pitch. The recording and playing apparatus includes: a light source; a photo detector; an optical system including a plurality of optical elements, the optical system converging light generated by the light source onto a track of the recording medium, and transmitting 0th-order light, +1st-order diffracted light, and −1st-order diffracted light, which are reflected by the recording medium and then incident to an incident surface of the photo detector; a tracking servo mechanism that keeps track of the recording medium; and a tracking servo circuit that controls the tracking servo mechanism based on output signals of the photo detector. The photo detector includes first to eighth photosensors, each of the first to eighth photosensors generating an output signal depending on incident light. The photo detector has a centerline on the incident surface, the centerline passing through an intersection of an optical axis of the optical system and the incident surface, and the centerline extending in a direction corresponding to a tangential direction of the track. The first, third, fourth, and seventh photosensors are disposed on one side with respect to the centerline, and the second, fifth, sixth, and eighth photosensors are disposed on another side with respect to the centerline. The third and fourth photosensors are disposed such that the first and seventh photosensors are positioned between the third and fourth photosensors in the direction parallel to the centerline. The fifth and sixth photosensors are disposed such that the second and eighth photosensors are positioned between the fifth and sixth photosensors in the direction parallel to the centerline. When a center of the 0th-order light coincides with the optical axis, the first photosensor covers a region on which overlapped light of the 0th-order light with the +1st-order diffracted light is incident, the second photosensor covers a region on which overlapped light of the 0th-order light with the −1st-order diffracted light is incident, each of the third to sixth photosensors covers a region on which the 0th-order light is incident, and on which the +1st-order diffracted light and the −1st-order diffracted light are not incident, and each of the seventh and eighth photosensors covers a region on which at least the 0th-order light is incident.

The recording and playing apparatus according to the present disclosure can more stably keep track of the recording medium than the prior art, when optically writing and reading information on and from the recording medium.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 3A is a schematic diagram illustrating diffraction of light, the light being incident on a recording medium and diffracted by the recording medium.

FIG. 3B is a schematic diagram illustrating light reflected by the recording medium and incident on a photo detector.

FIG. 4 is a schematic diagram illustrating photosensors obtaining a tracking error signal using the PP method.

FIG. 10A is a diagram illustrating a configuration of photosensors according to a second embodiment.

FIG. 11 is a diagram illustrating a tracking offset at a boundary track, occurring when obtaining a tracking error signal according to the second embodiment.

FIG. 12A is a schematic diagram illustrating diffraction of light, the light being incident on a recording medium and diffracted by the recording medium.

FIG. 13A is a diagram illustrating a configuration of photosensors according to a third embodiment.

FIG. 16 is a diagram illustrating a configuration of photosensors according to another embodiment.

FIG. 17 is a diagram illustrating a configuration of photosensors according to another embodiment.

FIG. 18D is a diagram illustrating a configuration of photosensors according to another embodiment.

DETAILED DESCRIPTION

From now on, embodiments will be described in detail with reference to the drawings as needed. It is noted that unnecessarily detailed descriptions may be omitted. For example, detailed descriptions of well-known facts and repeated descriptions of substantially the same elements may be omitted. This is used for the purpose of avoiding unnecessary redundancy of the following description and facilitating understanding by those skilled in the art.

The accompanying drawings and the following description are provided for sufficient understanding of this disclosure by those skilled in the art, and it is not intended to limit the subject matter described in claims thereto.

First Embodiment

A first embodiment will be described below with reference to FIGS. 1 to 8.

1-1. Purpose

The Push-Pull method (PP method) is widely used for detecting a tracking error signal in order to keep track of a recording medium, such as an optical disc. However, the PP method has a problem that an offset occurs in the tracking error signal when converging means, such as an object lens, shifts in the direction of an adjacent track with respect to a current track (a radial direction of the recording medium). The APP method is known as a method for solving this problem to detect a tracking error signal. The APP method cancels the offset of the tracking error signal, by using light in a partial region in the cross-section of a light beam from the optical disc, the partial region including not much push-pull tracking error information.

Thus, the APP method can reduce the offset in the tracking error signal caused by an object lens shift. However, the APP method cannot reduce the offset in the tracking error signal, occurring when the light generated by the light source is converged on a boundary track between recorded tracks and unrecorded tracks of the recording medium (hereinafter, such an offset will be referred to as a "boundary offset"). Thus, the APP method also has a problem in the stability of the tracking.

Thus, the present disclosure provides a recording and playing apparatus capable of reducing the boundary offset in the tracking error signal, occurring when the light generated by the light source is converged on the boundary track between the recorded tracks and the unrecorded tracks of the recording medium, and capable of more stably keeping track of the recording medium than the prior art.

1-2. Configuration

Figure 1:
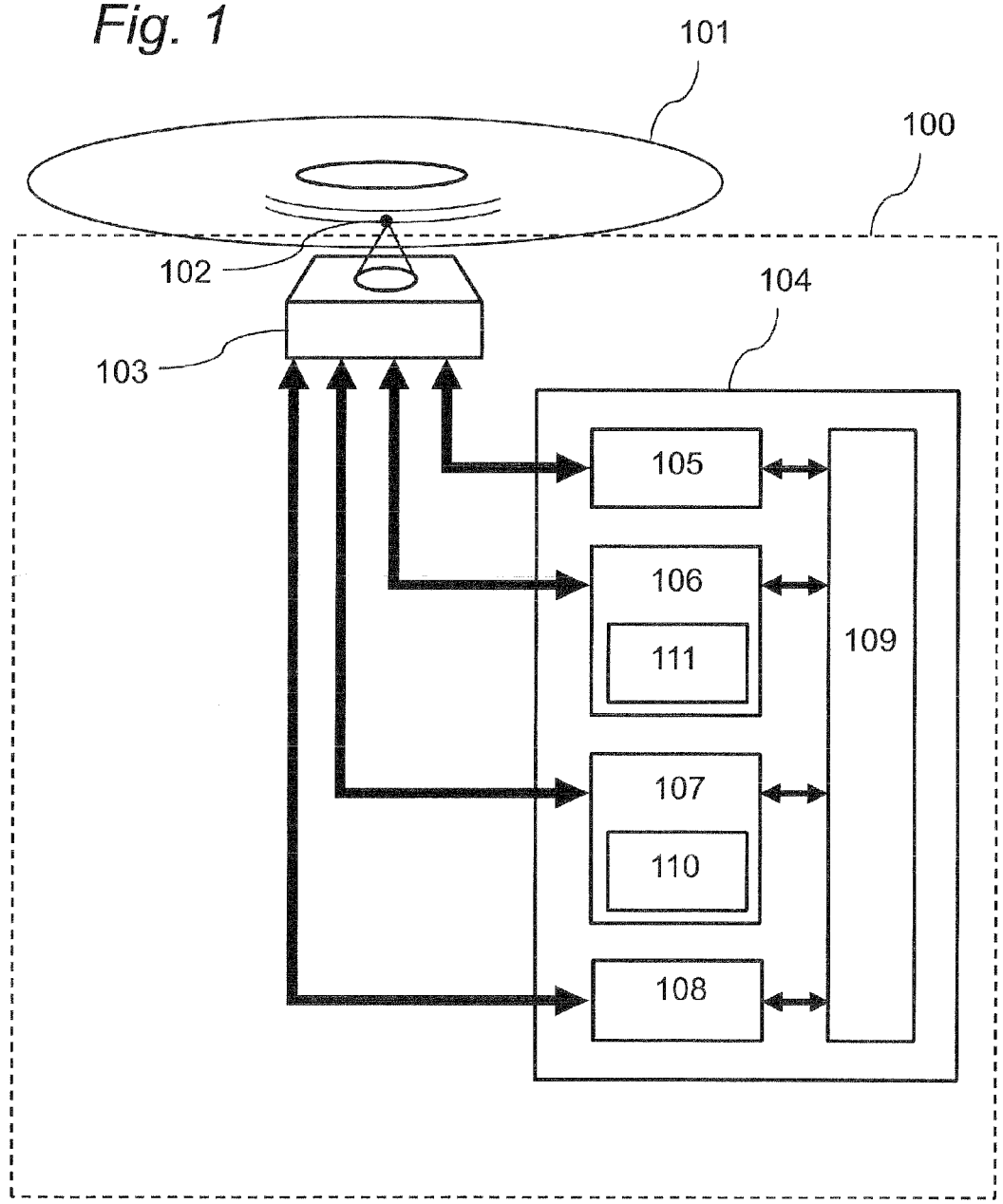
FIG. 1 is a block diagram of a recording and playing apparatus according to a first embodiment.

FIG. 1 is a block diagram of a recording and playing apparatus 100 according to the first embodiment. The recording and playing apparatus 100 writes and reads the information on and from the recording medium 101 having a plurality of tracks disposed at a predetermined pitch. As shown in FIG. 1, the recording and playing apparatus 100 includes an optical pickup 103 for forming a light spot 102 on the recording medium 101, and a drive circuit 104. The drive circuit 104 includes a recording circuit 105, a focusing servo circuit 106, a tracking servo circuit 107, a signal detection circuit 108, and a controller 109. The tracking servo circuit 107 includes a calculation circuit 110. The focusing servo circuit 106 includes a calculation circuit 111.

Figure 2:
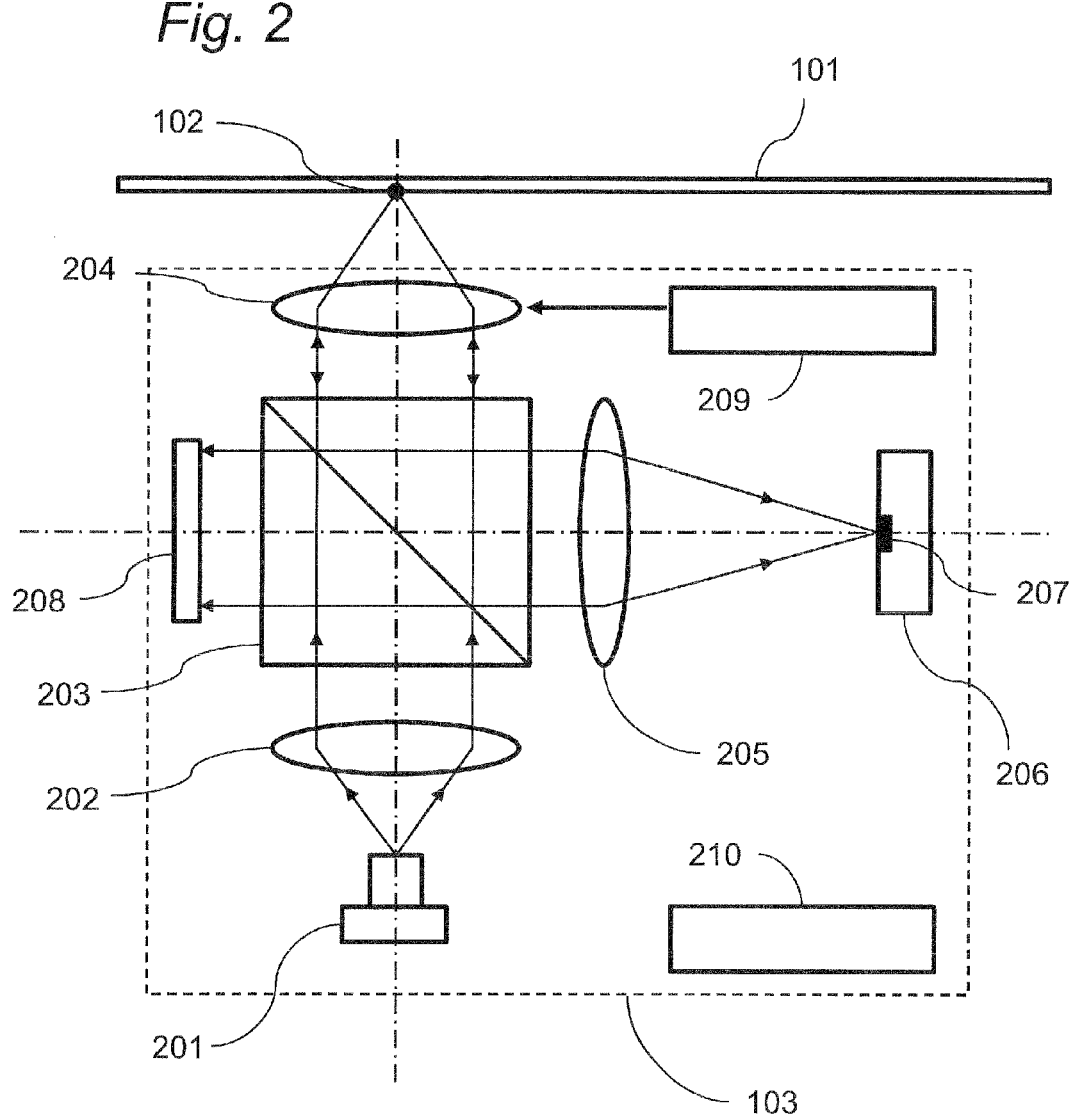
FIG. 2 is a diagram illustrating a configuration of an optical pickup according to the first embodiment.

FIG. 2 is a diagram illustrating a configuration of the optical pickup 103 according to the first embodiment. The optical pickup 103 includes a light source 201, a collimating lens 202, a beam splitter 203, an object lens 204 as an exemplary converging means, and a detection lens 205. The collimating lens 202, the beam splitter 203, the object lens 204, and the detection lens 205 are optical elements constituting the optical system of the optical pickup 103. In addition, the optical pickup 103 includes a photo detector 206 and a light amount detector 208. In addition, the optical pickup 103 includes an object lens actuator 209 and a head positioner 210.

The light from the light source 201 is transformed into the parallel beam by the collimating lens 202, and then passes through the beam splitter 203 and the object lens 204 to form a light spot 102 on the recording medium 101.

The light of the light spot 102 is reflected by the recording medium 101, and the reflected light passes through the object lens 204, is reflected by the beam splitter 203, passes through the detection lens 205, and then is incident on a sensor array 207 disposed on the incident surface of the photo detector 206. In addition, part of the light from the light source 201 is reflected by the beam splitter 203, and is incident on the light amount detector 208 for detecting the amount of the light emitted from the light source 201.

The optical system of the optical pickup 103 converges the beam generated by the light source 201 onto a track of the recording medium 101, and transmits 0th-order light, +1st-order diffracted light, and −1st-order diffracted light, which are reflected by the recording medium 101, to the incident surface of the photo detector 206.

The detection lens 205 is, for example, a cylindrical lens. In addition, the sensor array 207 includes a plurality of photosensors, that is, the sensor array 207 is divided into the photosensors. Each of the plurality of photosensors generates an output signal corresponding to an amount of the light reflected and received from the recording medium 101. Based on the output signals of the optical pickup 103, a focusing error signal, a tracking error signal, and the like are generated as described below.

The object lens actuator 209 moves the object lens 204 along the optical axis of the optical system so as to focus on a track of the recording medium 101, under the control of the focusing servo circuit 106. In addition, the object lens actuator 209 moves the object lens 204 in the direction of a adjacent track with respect to the current track (a radial direction of the recording medium 101) so as to keep track of the recording medium 101, under the control of the tracking servo circuit 107. The head positioner 210 moves the entire optical pickup 103 in the radial direction of the recording medium 101 so as to keep track of the recording medium 101, under the control of the tracking servo circuit 107. Therefore, the object lens actuator 209 and the head positioner 210 operate as a tracking servo mechanism of the recording and playing apparatus 100.

Again referring to FIG. 1, the recording circuit 105 drives and modulates the light source 201 of the optical pickup 103. The focusing servo circuit 106 controls the focusing operation of the optical pickup 103. The tracking servo circuit 107 controls the tracking operation of the optical pickup 103. The signal detection circuit 108 detects an information signal from the output signals of the optical pickup 103. The controller 109 controls all of the recording circuit 105, the focusing servo circuit 106, the tracking servo circuit 107, and the signal detection circuit 108. The output signals of the optical pickup 103, generated by the sensor array 207 including the plurality of photosensors, are input into the drive circuit 104.

The focusing error signal is a signal indicating a focusing error of the optical pickup 103 with respect to the recording surface of the recording medium 101. The calculation circuit 111 of the focusing servo circuit 106 generates a focusing error signal, for example, using the astigmatism method, from the outputs signals of the optical pickup 103, generated by the sensor array 207 including a plurality of light receiving regions.

The optical pickup 103 focuses on a track of the recording medium 101 based on the focusing error signal. The focusing servo circuit 106 generates a focus drive signal based on the focusing error signal. The optical pickup 103 moves the object lens 204 along the optical axis by driving the object lens actuator 209 of the optical pickup 103 according to the focus drive signal generated by the focusing servo circuit 106, and focuses on the track of the recording medium 101.

The tracking error signal is a signal indicating a positional error of the light spot of the optical pickup 103 relative to a track of the recording medium 101. The calculation circuit 110 of the tracking servo circuit 107 generates a tracking error signal, using the method described below with reference to FIGS. 7A, 7B, and 8, from the output signals of the optical pickup 103, generated by the sensor array 207 including the plurality of light receiving regions.

The optical pickup 103 keeps track of the recording medium 101 based on the tracking error signal. The tracking servo circuit 107 generates a tracking drive signal based on the tracking error signal. The optical pickup 103 moves (shifts) the object lens 204 in a direction parallel to the recording surface of the recording medium 101 by driving the object lens actuator 209 and the head positioner 210 of the optical pickup 103 based on the tracking drive signal generated by the tracking servo circuit 107, and makes the light spot 102 follow a track on the recording medium 101.

The recording circuit 105 causes the amount of the light emitted from the light source 201 to be constant, based on the output signal of the luminous energy detector 208. In addition, the recording circuit 105 performs the modulation and the like of the light source 201 according to on the information to be written on the recording medium 101.

The signal detection circuit 108 generates an information signal corresponding to the information recorded on the recording medium 101, and address information corresponding to the positions of the track and the sector, and the like, based on the output signals of the optical pickup 103.

The controller 109 controls the focusing servo circuit 106 and the tracking servo circuit 107 for appropriate focusing and tracking. In addition, the controller 109 causes the optical pickup 103 to seek a track based on the address information from the signal detection circuit 108, causes the recording circuit 105 to write the information on the track, and causes the signal detection circuit 108 to read the information from the track.

FIGS. 3A and 3B are schematic diagrams illustrating diffraction of the light from the optical pickup 103, the light being reflected by the recording medium 101, such as a rewritable Blu-ray (registered trademark) disc (BD-RE), and diffracted by grooves of the tracks of the recording medium 101. FIG. 3A illustrates 0th-order light 301, +1st-order diffracted light 302, and −1st-order diffracted light 303. The +1st-order diffracted light 302 is diffracted in a direction perpendicular to the tangential direction of the track of the recording medium 101 (radial direction), and part of the +1st-order diffracted light 302 overlaps the 0th-order light 301. The −1st-order diffracted light 303 is diffracted in a position opposite to the +1st-order diffracted light 302 with respect to the tangential direction of the track of the recording medium 101, and part of the −1st-order diffracted light 303 overlaps the 0th-order light 301. FIG. 3B illustrates the light corresponding to the 0th-order light 301, the +1st-order diffracted light 302, and the −1st-order diffracted light 303 as shown in FIG. 3A, the light as shown in FIG. 3B having passed through the aperture of the object lens 204, and being incident on the sensor array 207 disposed on the photo detector 206. In general, since the aperture of the detection lens 205 is set to be larger than that of the object lens 204, the limitation of aperture only depends on the object lens 204. A circle 311 indicates the light corresponding to the 0th-order light 301 (hereinafter referred to as 0th-order light 311). A hatched portion 312 indicates the portion where the 0th-order light 301 overlaps the +1st-order diffracted light 302. Similarly, a hatched portion 313 indicates the portion where the 0th-order light 301 overlaps the −1st-order diffracted light 303. It should be noted that in some diagrams of FIG. 4 and thereafter, the hatching of the hatched portion 312 and the hatched portion 313 is omitted for ease of illustration. In addition, for ease of notation, the hatched portion 312 and the hatched portion 313 may be merely referred to as +1st-order light 312 and −1st-order light 313, respectively.

Before explaining generation of the tracking error signal according to the present embodiment, the case where the sensor array 207 is configured so as to generate a tracking error signal using the PP method or the APP method will be described with reference to FIGS. 4 to 6.

FIG. 4 is a schematic diagram illustrating the sensor array 207 obtaining a tracking error signal using the PP method.

FIG. 4 illustrates the 0th-order light 311, the +1st-order light 312, and the −1st-order light 313, which are incident on the sensor array 207. The photo detector 206 has a first direction (X direction) and a second direction (Y direction) on its incident surface, the first direction corresponding to the direction of an adjacent track with respect to a current track on the recording medium 101 (a radial direction), and the second direction corresponding to the tangential direction of the track on the recording medium 101. The center of the 0th-order light 311 (the optical axis) is set to coincide with a center 207c of the sensor array 207. The sensor array 207 of the photo detector 206 has a centerline M-M' on its incident surface, the centerline M-M' passing through an intersection of the optical axis of the optical system and the incident surface (that is, the center 207c of the sensor array 207) and extending in the direction corresponding to the tangential direction of the track (Y direction). In addition, the sensor array 207 is divided into four photosensors 401 to 404.

When S401 to S404 denote output signals of the photosensors 401 to 404, respectively, the calculation circuit 110 calculates the tracking error signal TE according to the PP method using the following equation.

$$TE=(S401+S402)-(S403+S404)$$

When the light spot 102 is in the center of the track (for example, the center of a groove of the recording medium 101), the +1st-order diffracted light 302 and the −1st-order diffracted light 303 has symmetrically diffracted wave fronts, and an amount of the light incident on the photosensors 401 and 402 is equal to an amount of the light incident on the photosensors 403 and 404, and consequently, TE=0 holds. The tracking servo circuit 107 controls the position of the light spot 102 with respect to the track such that TE=0 holds. A broken-line circle 314 of FIG. 4 indicates the 0th-order light obtained when the object lens 204 is shifted (for ease of illustration, the corresponding +1st-order light and −1st-order light are not shown). Thus, when the object lens 204 is shifted, the amount of the light incident on the photosensors 403 and 404 decreases and the amount of the light incident on the photosensors 401 and 402 increases in spite of the light spot 102 being in the center of the track, consequently, resulting in TE>0 holds. This leads to the offset of the tracking error signal, impairs the stability of the tracking servo operation, and in addition, leads to the error when the light spot 102 is aligned to the center of the track.

It should be noted that when the detection lens 205 is configured as an appropriate cylindrical lens, the calculation circuit 111 calculates a focusing error signal (FE) according to the astigmatism method using the following equation.

$$FE=(S401+S403)-(S402+S404)$$

Figure 5:
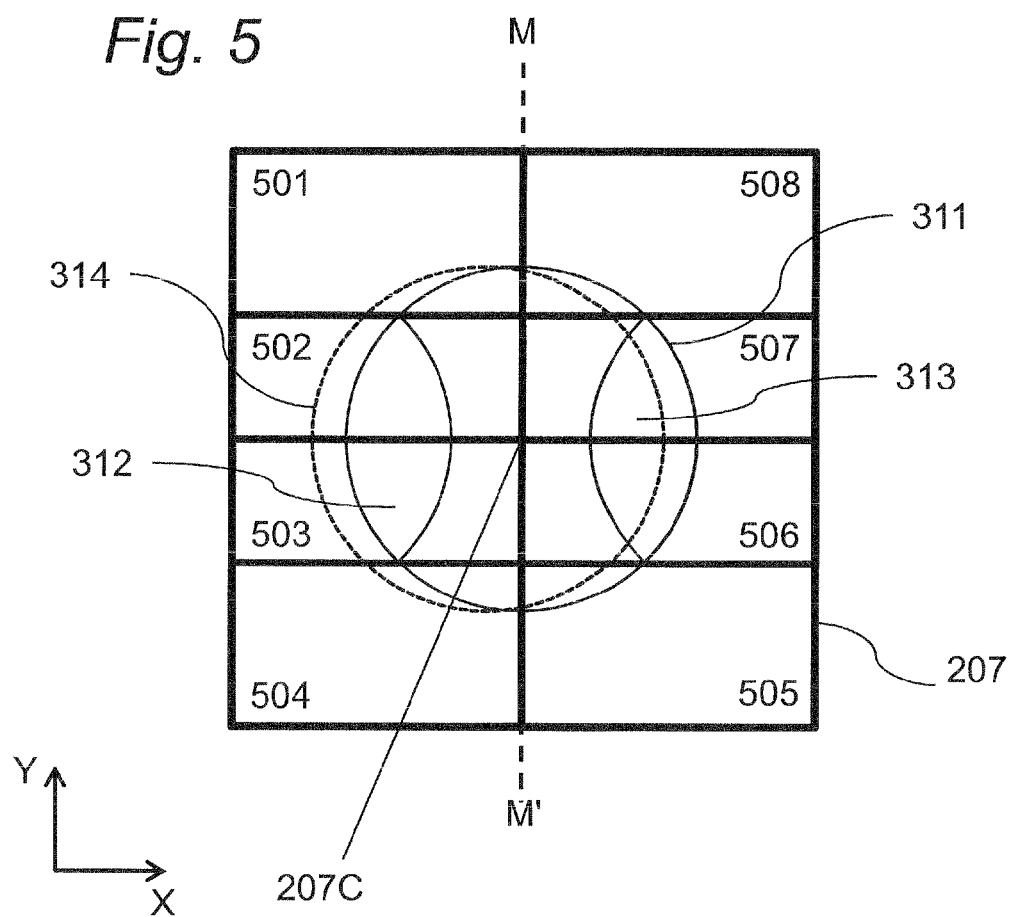
FIG. 5 is a schematic diagram illustrating photosensors obtaining a tracking error signal according to the APP method.

FIG. 5 is a schematic diagram illustrating the sensor array 207 obtaining a tracking error signal according to the APP method.

FIG. 5 illustrates the 0th-order light 311, the +1st-order light 312, and the −1st-order light 313, which are incident on the sensor array 207. The center of the 0th-order light 311 (the optical axis) is set to coincide with the center 207c of the sensor array 207. In addition, the sensor array 207 is divided into eight photosensors 501 to 508. In this case, the photosensors 501, 504, 505, and 508 are positioned on regions at both ends in the Y direction, on which mainly the 0th-order light 311 is incident.

Let S501 to S508 denote the output signals of the photosensors 501 to 508, respectively. The calculation circuit 110 calculates the tracking error signal TE according to the APP method using the following equation.

$$TE=\{(S502+S503)-(S506+S507)\}-k\times\{(S501+S504)-(S505+S508)\}$$

The photosensors 502, 503, 506, and 507 substantially cover the +1st-order light 312 and the −1st-order light 313. Therefore, by using $\{(S502+S503)-(S506+S507)\}$, it is possible to obtain the tracking error signal substantially equivalent to the case of using the PP method. In addition, when the object lens shift occurs as illustrated by the broken-line circle 314, $\{(S502+S503)-(S506+S507)\}>0$ holds, and an offset occurs. However, $\{(S501+S504)-(S505+S508)\}$ including almost no push-pull tracking-error signal component is a non-zero positive value. Therefore, by setting a suitable coefficient k, it is possible to cancel the offset in the tracking error signal TE according to the APP method.

It should be noted that when the detection lens 205 is configured as an appropriate cylindrical lens, the calculation circuit 111 calculates a focusing error signal (FE) according to the astigmatism method using the following equation.

$$FE=(S501+S502+S505+S506)-(S503+S504+S507+S508)$$

Figure 6:
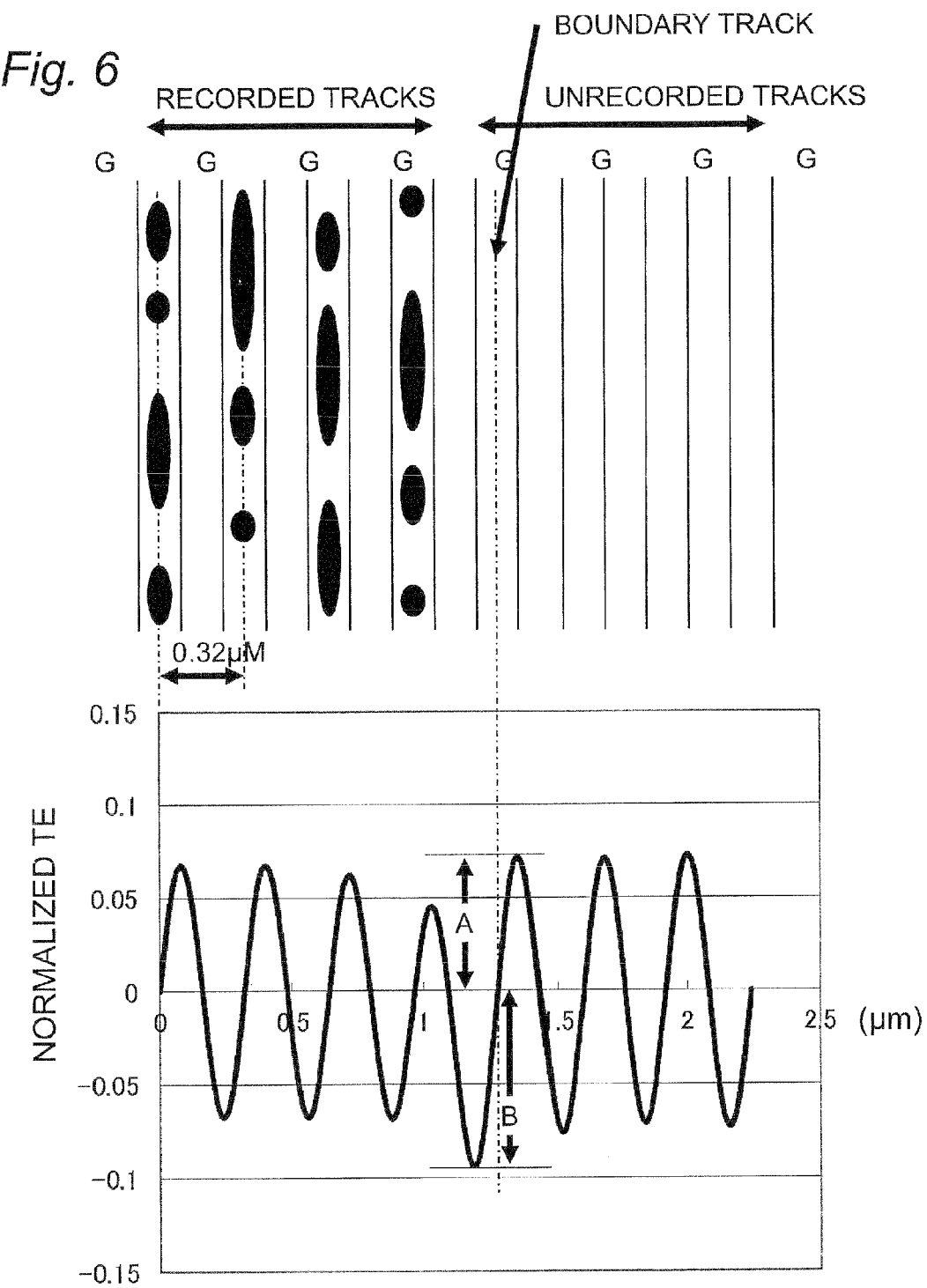
FIG. 6 is a diagram illustrating a tracking offset at a boundary track, occurring when obtaining a tracking error signal according to the APP method.

FIG. 6 is a diagram illustrating the tracking offset in the boundary track, occurring when obtaining the tracking error signal according to the APP method in the case where information is written or read on or from the recording medium 101, such as a BD-RE. Since signals are recorded on grooves, the track pitch and the groove pitch are equally 0.32 μm. "G" in the figure denotes a groove. In this case, the offset caused by the object lens shift is cancelled by setting k=2. When the tracking servo is turned on, the tracking servo circuit 107 moves the light spot 102 to the position of TE=0 as shown in FIG. 6. It is desirable that the TE waveform is symmetrical with respect to TE=0, that is, a positive amplitude is equal to a negative amplitude. In the case of FIG. 6, left four grooves are recorded tracks, and right four grooves are unrecorded tracks. With respect to the fifth unrecorded track from the left (boundary track), it can be seen that the symmetry of the TE waveform deteriorates at that position, and a boundary offset occurs. Let "A" denote the positive amplitude of the TE waveform, and "B" denote the negative amplitude of the TE waveform. As an index for evaluating the symmetry of the TE waveform, the following equation may be used.

$$\text{TE offset}=50\times(A-B)/(A+B)\ (\%)$$

When the bottom of the TE waveform is TE=0, TE offset is +50%. When the peak of the TE waveform is TE=0, TE offset is −50%. In the boundary track as shown in FIG. 6, TE offset as the boundary offset is −6.8%. Thus, when the light generated by the light source 201 is converged on the boundary track between the recorded tracks and the unrecorded tracks, a boundary offset occurs in the tracking error signal, and there are problems that an off-track occurs in the boundary track, and that the stability of the tracking servo operation is impaired.

Next, with reference to FIGS. 7A, 7B, and 8, the photo detector 206 of the recording and playing apparatus 100 according to the present embodiment will be described.

Figure 7A:
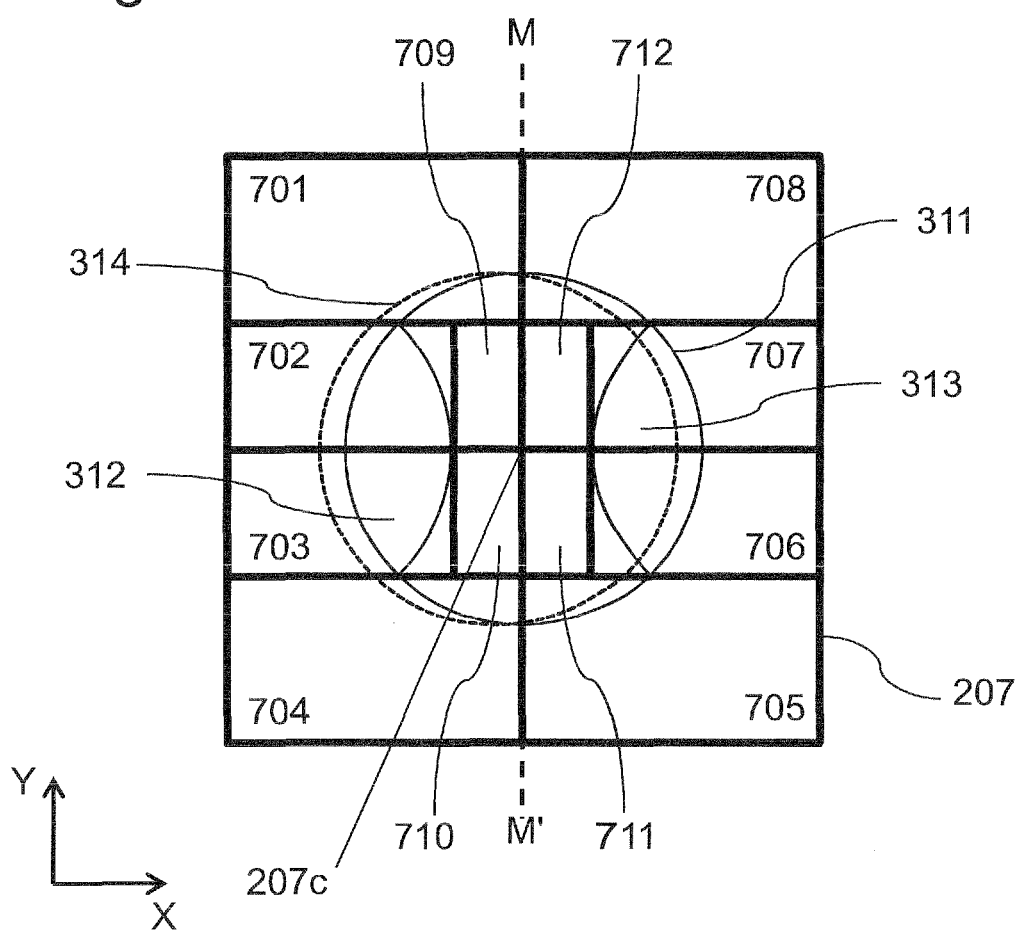
FIG. 7A is a diagram illustrating a configuration of photosensors according to the first embodiment.

FIG. 7A is a diagram illustrating a configuration of the sensor array 207 for reducing the boundary offset according to the present embodiment. FIG. 7A illustrates the 0th-order light 311, the +1st-order light 312, and the −1st-order light 313, which are incident on the sensor array 207. The center of the 0th-order light 311 (the optical axis) is set to coincide with the center 207c of the sensor array 207. The sensor array 207 is divided into twelve photosensors 701 to 712.

The photosensors 702 and 703 are the first photosensors covering the regions on which the overlapped light of the 0th-order light with the +1st-order diffracted light is incident, when the center of the 0th-order light coincides with the optical axis.

The photosensors 706 and 707 are the second photosensors covering the regions on which the overlapped light of the 0th-order light with the −1st-order diffracted light is incident, when the center of the 0th-order light coincides with the optical axis.

The photosensors 701 and 704 are the third and fourth photosensors disposed on the same side as that of the photosensors 702 and 703 with respect to the centerline M-M', and disposed such that the photosensors 702 and 703 are positioned between the photosensors 701 and 704 in the direction parallel to the centerline M-M'. The photosensors 701 and 704 cover the regions on which the 0th-order light is incident, and on which the +1st-order diffracted light and the −1st-order diffracted light are not incident, when the center of the 0th-order light coincides with the optical axis.

The photosensors 708 and 705 are the fifth and sixth photosensors disposed on the same side as that of the photosensors 706 and 707 with respect to the centerline M-M', and disposed such that the photosensors 706 and 707 are positioned between the photosensors 708 and 705 in the direction parallel to the centerline M-M'. The photosensors 705 and 708 cover the regions on which the 0th-order light is incident, and on which the +1st-order diffracted light and the −1st-order diffracted light are not incident, when the center of the 0th-order light coincides with the optical axis.

The photosensors 709 and 710 are the seventh photosensors disposed on the same side as that of the photosensors 702 and 703 with respect to the centerline M-M', and disposed between the photosensors 701 and 704. The photosensors 709 and 710 cover the regions on which at least the 0th-order light is incident, when the center of the 0th-order light coincides with the optical axis.

The photosensors 711 and 712 are the eighth photosensors disposed on the same side as that of the photosensors 706 and 707 with respect to the centerline M-M', and disposed between the photosensors 705 and 708. The photosensors 711 and 712 cover the regions on which at least the 0th-order light is incident, when the center of the 0th-order light coincides with the optical axis.

Each of the photosensors 709 to 712 covers the region on which the 0th-order light is incident, and on which the +1st-order diffracted light and the −1st-order diffracted light are not incident, when the center of the 0th-order light coincides with the optical axis.

In this case, the photosensors 701, 704, 705, 708, 709 to 712 are positioned on the regions on which mainly the 0th-order light 311 is incident. These photosensors are not limited to be positioned on such regions on which only the 0th-order light 311 is incident, but the +1st-order diffracted light or the −1st-order diffracted light may be incident on these photosensors. In addition, the photosensors 709 and 710 mainly receive the 0th-order light 311. Similarly, the photosensors 711 and 712 mainly receive the 0th-order light 311.

In the present embodiment, let S701 to S712 denote the output signals of the photosensors 701 to 712, respectively, the calculation circuit 110 calculates the tracking error signal TE using the following equation.

$$TE=\{(S702+S703)-(S706+S707)\}-k1\times\{(S701+S704)-(S705+S708)\}-k2\times\{(S709+S710)-(S711+S712)\}$$

It should be noted that when the detection lens 205 is configured as an appropriate cylindrical lens, the calculation circuit 111 obtains a focusing error signal (FE) according to the astigmatism method using the following equation.

$$FE=(S701+S702+S709+S705+S706+S711)-(S703+S704+S710+S707+S708+S712)$$

In this case, the sensor array 207 is divided into twelve photosensors 701 to 712 in order to illustrate the focusing error signal detection according to the astigmatism method. However, when considering only the function of the tracking error signal detection, the sensor array 207 receives the light incident on the regions A to F as shown in FIG. 7B, respectively, as described below.

Figure 7B:
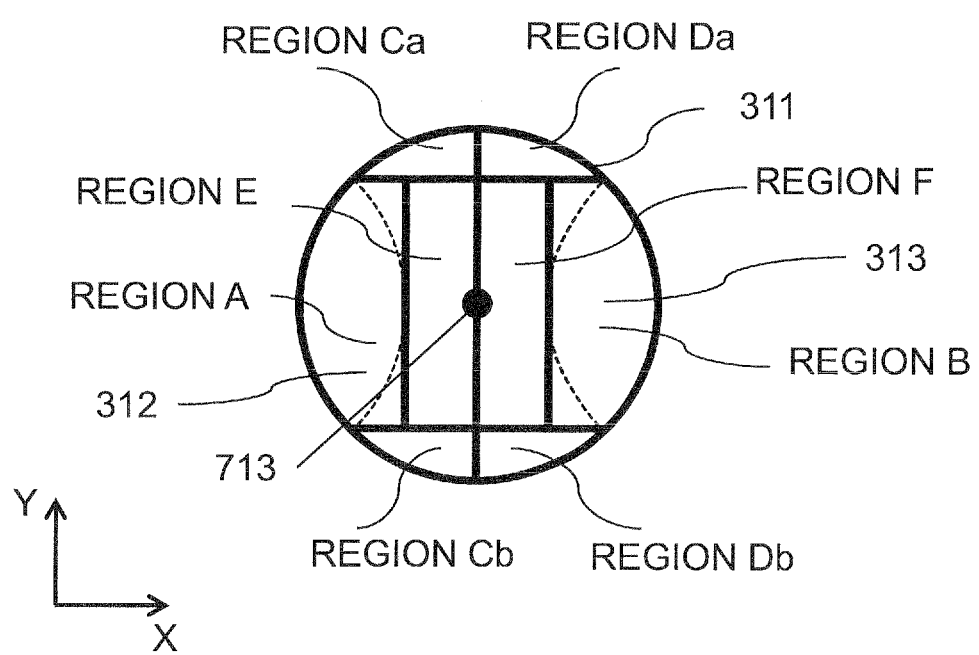
FIG. 7B is a diagram illustrating regions A to F according to the first embodiment, on which reflected light from the recording medium is incident and received by the photosensors.

FIG. 7B is a diagram illustrating regions A to F according to the first embodiment, on which reflected light of the recording medium is incident on the photosensors. The photosensors 702 and 703 receive the light incident on the region A. The photosensors 706 and 707 receive the light incident on the region B. The photosensors 701 and 704 receive the light incident on the regions Ca and Cb, respectively. The photosensors 705 and 708 receive the light incident on the regions Da and Db, respectively. The photosensors 709 and 710 receive the light incident on the region E. The photosensors 711 and 712 receive the light incident on the region F.

As can be clearly understood from FIGS. 7A and 7B, the region A mainly consists of the overlapped portion of the 0th-order light with the +1st-order diffracted light, and the region B mainly consists of the overlapped portion of the 0th-order light with the −1st-order diffracted light. In addition, among the regions positioned at both ends in the Y direction, on which mainly the 0th-order light is incident, the regions Ca and Cb are positioned on the side of the region A, and the regions Da and Db are positioned on the side of the region B. Further, among the regions other than the regions A, B, Ca, Cb, Da, and Db, the region E is positioned on the side of the region A with respect to the centerline M-M', and the region F is positioned on the side of the region B with respect to the centerline M-M'. In this case, let SA to SF denote the output signals of the photosensors receiving the light incident on the regions A to F, respectively, and k1 and k2 denote predetermined constant coefficients, the calculation circuit 110 calculates the tracking error signal TE using the following equation.

$$TE=SA-SB-k1\times(SCa+SCb-SDa-SDb)-k2\times(SE-SF)$$

The tracking servo circuit 107 controls the tracking servo mechanism so as to reduce the tracking error signal TE.

The calculation circuit 110 sets the value of the coefficient k1, such that a change in the average level of the tracking error signal TE, the change occurring when the object lens 204 (a part of the plurality of optical elements), is moved in the direction of movement of the tracking servo mechanism (the radial direction of the recording medium 101) is smaller than a change in the case of k1=0.

The calculation circuit 110 sets the value of the coefficient k2, such that a change in the average level of the tracking error signal TE, the change occurring when the light generated by the light source 201 is converged on the boundary track between the recorded tracks and the unrecorded tracks of the recording medium 101, is smaller than a change in the case of k2=0. In this case, the calculation circuit 110 sets a different coefficient k2 depending on the pitch and the depth of the track of the recording medium 101.

According to the present embodiment, it is possible to cancel or reduce the boundary offset by using the output signals of the photosensors 709 to 712 receiving the light incident on the regions E and F.

Figure 8:
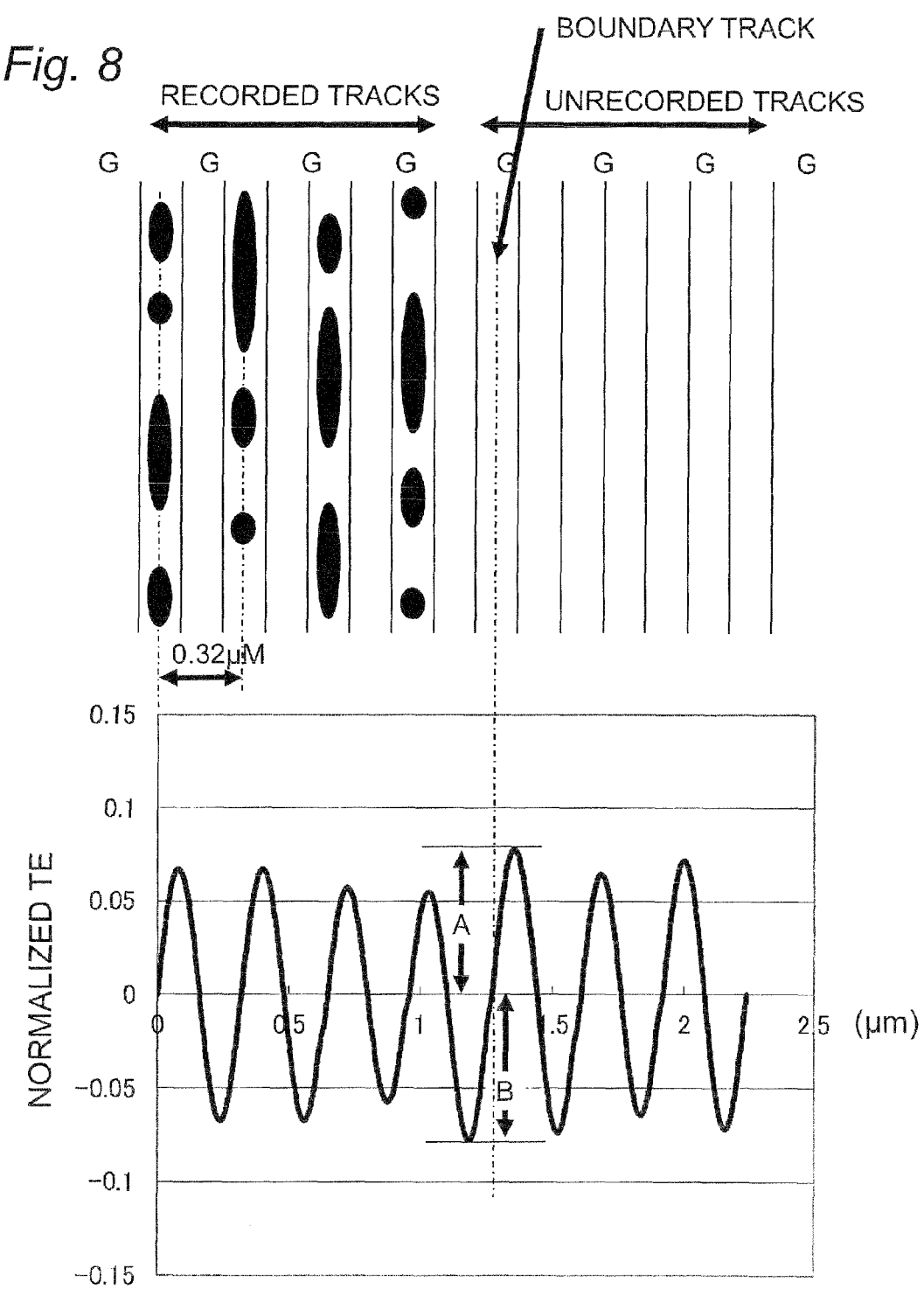
FIG. 8 is a diagram illustrating a tracking offset at a boundary track, occurring when obtaining a tracking error signal according to the first embodiment.

FIG. 8 is a diagram illustrating the tracking offset in the boundary track, occurring when obtaining the tracking error signal using the method according to the present embodiment in the case where information is written or read on or from the recording medium 101, such as a BD-RE. The offset caused by the object lens shift is canceled or reduced by setting k1=2.4. Further, k2=1 is set in order to reduce the boundary offset.

When the tracking servo is turned on, the tracking servo circuit 107 moves the light spot 102 to the position of TE=0 as shown in FIG. 8. In this case of FIG. 8, left four grooves are recorded tracks, and right four grooves are unrecorded tracks. Let "A" denote the positive amplitude of the TE waveform, and "B" denote the negative amplitude of the TE waveform, then the boundary offset in the boundary track (the fifth track from the left) is obtained using the following equation.

Boundary Offset=50×(A−B)/(A+B)=−0.4(%)

The boundary offset is significantly reduced from the case of using the APP method of FIG. 6, i.e., −6.8%. It is possible to achieve more stable tracking servo operation.

1-3. Advantageous Effects

As described above, in the present embodiment, the recording and playing apparatus 100 writes and reads the information on and from the recording medium 101 having a plurality of tracks disposed at a predetermined pitch. The recording and playing apparatus 100 includes: a light source 201; a photo detector 206; an optical system including a plurality of optical elements for converging the light generated by the light source 201 onto the track of the recording medium 101, and for transmitting the 0th-order light, the +1st-order diffracted light, and the −1st-order diffracted light, which are reflected by the recording medium 101, to the incident surface of the photo detector 206; a tracking servo mechanism for keeping track of the recording medium 101; and a tracking servo circuit 107 for controlling the tracking servo mechanism based on the output signals of the photo detector 206. The photo detector 206 includes photosensors 701 to 712 for generating respective output signals depending on the incident light. The photo detector 206 has a centerline M-M' on its incident surface, the centerline M-M' passing through the intersection of the optical axis of the optical system and the incident surface, and extending in the direction corresponding to the tangential direction of the track. The photosensors 701 to 704, 709, and 710 are disposed on one side with respect to the centerline M-M', and the photosensors 705 to 708, 711, and 712 are disposed on the other side with respect to the centerline M-M'. The photosensors 701 and 704 are disposed such that the photosensors 702, 703, 709, and 710 are positioned between the photosensors 701 and 704 in the direction parallel to the centerline M-M'. The photosensors 705 and 708 are disposed such that the photosensors 706, 707, 711, and 712 are positioned between the photosensors 705 and 708 in the direction parallel to the centerline M-M'. When the center of the 0th-order light coincides with the optical axis, the photosensors 702 and 703 cover the regions on which the overlapped light of the 0th-order light with the +1st-order diffracted light is incident, the photosensor 706 and 707 cover the regions on which the overlapped light of the 0th-order light with the −1st-order diffracted light is incident, each of the photosensors 701, 704, 705, and 708 covers the region on which the 0th-order light is incident, and on which the +1st-order diffracted light and the −1st-order diffracted light are not incident, and each of the photosensors 709 to 712 covers the region on which at least the 0th-order light is incident.

In the present embodiment, each of the photosensors 709 to 712 covers the region on which the 0th-order light is incident, and on which the +1st-order diffracted light and the −1st-order diffracted light are not incident, when the center of the 0th-order light coincides with the optical axis.

Accordingly, it is possible to reduce the boundary offset in the tracking error signal, occurring when the light generated by the light source 201 is converged on the boundary track between the recorded tracks and the unrecorded tracks of the recording medium 101, thus achieving appropriate tracking of the recording medium 101.

Second Embodiment

A second embodiment will now be described with reference to FIGS. 9A to 11.

2-1. Configuration

While a higher-density recording medium is desired, a BD-RE having increased density is studied. One approach is to reduce the track pitch of a recording medium. However, a track pitch of the BD-RE, i.e., a groove pitch is 0.32 μm, and further reducing the groove pitch is undesirable from the viewpoints of the difficulty in manufacturing the recording medium and the fabrication yield of the recording medium. Thus, the groove pitch is conversely set larger than 0.32 μm, and instead, the land and groove recording is often used for writing and reading information on and from both land and groove. In this case, for example, when the groove pitch is 0.45 μm, the track pitch for writing and reading information is 0.225 μm. It is possible increase the density than that of the BD-RE by approximately 1.42 times.

When the groove pitch increases, the diffraction angles of the +1st-order diffracted light and the −1st-order diffracted light, which are diffracted by the grooves, also change. Let P denote the groove pitch, and let λ denote the wavelength of the light source 201, then the diffraction angle θ is approximately obtained using the following equation.

θ=λ/P(rad)

The increase of the groove pitch P from 0.32 μm to 0.45 μm results in the decrease in the diffraction angle θ in inverse proportion.

Figure 9A:
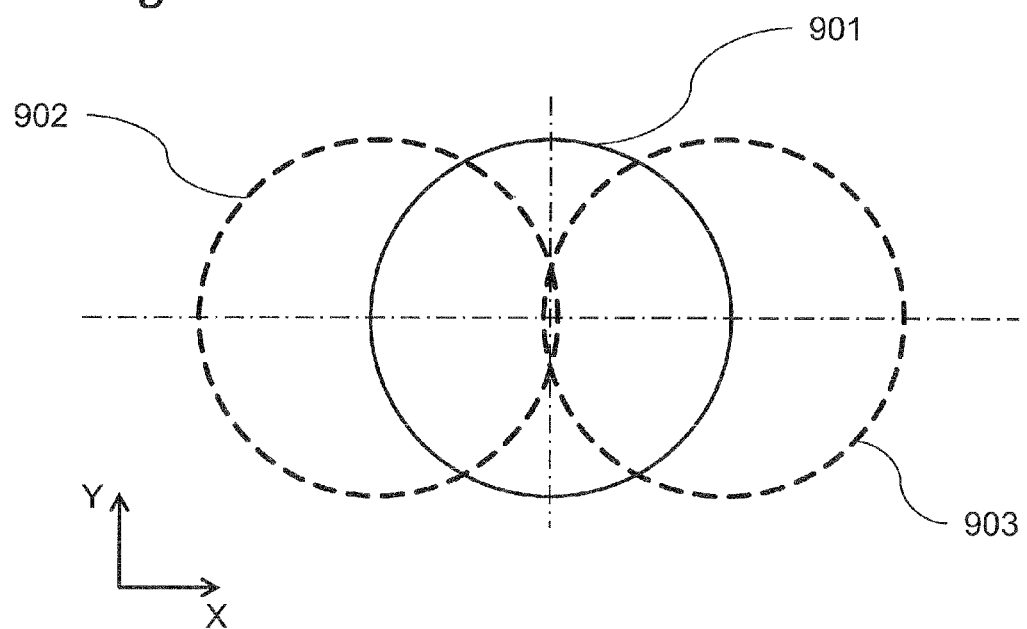
FIG. 9A is a schematic diagram illustrating diffraction of light, the light being incident on a recording medium and diffracted by the recording medium.
Figure 9B:
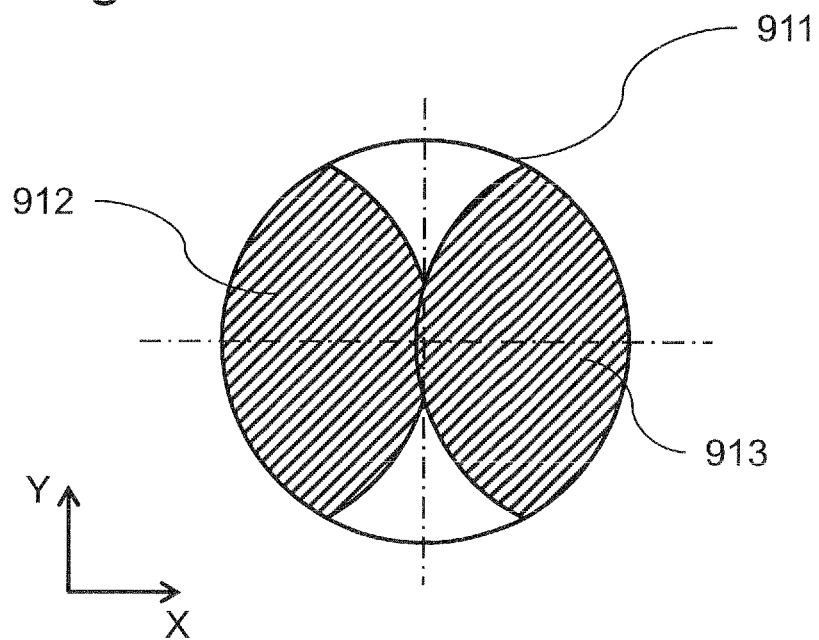
FIG. 9B is a schematic diagram illustrating light reflected by the recording medium and incident on a photo detector.

FIGS. 9A and 9B are schematic diagrams illustrating diffraction of the light from the optical pickup 103, the light being reflected by a recording medium 101 having a groove pitch of 0.45 μm, and diffracted by grooves of the tracks of the recording medium 101. FIG. 9A illustrates 0-th-order light 901, +1st-order diffracted light 902, and −1st-order diffracted light 903. FIG. 9B illustrates the light corresponding to the 0th-order light 901, the +1st-order diffracted light 902, and the −1st-order diffracted light 903 as shown in FIG. 9A, the light as shown in FIG. 9B having passed through the aperture of the object lens 204, and being incident on the sensor array 207 disposed on the photo detector 206. A circle 911 indicates the light corresponding to the 0th-order light 901 (hereinafter referred to as 0th-order light 911). A hatched portion 912 indicates the portion where the 0th-order light 901 overlaps the +1st-order diffracted light 902. Similarly, a hatched portion 913 indicates the portion where the 0th-order light 901 overlaps the −1st-order diffracted light 903. For ease of notation, the hatched portion 912 and the hatched portion 913 may be merely referred to as +1st-order light 912 and −1st-order light 913, respectively.

Referring to FIGS. 9A and 9B, it can be seen that since the diffraction angle is smaller than that of the case in FIGS. 3A and 3B, the light beams of the +1st-order diffracted light 902 and the −1st-order diffracted light 903 are close to each other, and the region of the +1st-order diffracted light 902 and the region of the −1st-order diffracted light 903 overlap with most of the region of the 0th-order light 901. When this light is received by the sensor array 207 according to the first embodiment as shown in FIG. 7A, a large amount of peripheral light of the +1st-order light and the −1st-order light is incident on photosensors 709 to 712 for receiving mainly the 0th-order light. Therefore, as illustrated for the BD-RE, it is not possible sufficiently reduce the boundary offset in the tracking error signal, occurring when the light generated by the light source 201 is converged on the boundary track between the recorded tracks and the unrecorded tracks of the recording medium 101.

Thus, the recording and playing apparatus 100 according to the present embodiment uses a sensor array 207 as shown in FIG. 10A.

FIG. 10A illustrates a configuration of the sensor array 207 according to the present embodiment. FIG. 10A illustrates the 0th-order light 911, the +1st-order light 912, and the −1st-order light 913, which are incident on the sensor array 207, and the center of the 0th-order light 911 (the optical axis) is set to coincide with a center 207c of the sensor array 207. The sensor array 207 is divided into twelve photosensors 1001 to 1012.

The photosensors 1002 and 1003 are the first photosensors covering the regions on which the overlapped light of the 0th-order light with the +1st-order diffracted light is incident, when the center of the 0th-order light coincides with the optical axis.

The photosensors 1006 and 1007 are the second photosensors covering the regions on which the overlapped light of the 0th-order light with the −1st-order diffracted light is-incident, when the center of the 0th-order light coincides with the optical axis.

The photosensors 1001 and 1004 are the third and fourth photosensors disposed on the same side as that of the photosensors 1002 and 1003 with respect to the centerline M-M', and disposed such that the photosensors 1002 and 1003 are positioned between the photosensors 1001 and 1004 in the direction parallel to the centerline M-M'. The photosensors 1001 and 1004 cover the regions on which the 0th-order light is incident, and on which the +1st-order diffracted light and the −1st-order diffracted light are not incident, when the center of the 0th-order light coincides with the optical axis.

The photosensors 1008 and 1005 are the fifth and sixth photosensors disposed on the same side as that of the photosensors 1006 and 1007 with respect to the centerline M-M', and disposed such that the photosensors 1006 and 1007 are positioned between the photosensors 1008 and 1005 in the direction parallel to the centerline M-M'. The photosensors 1005 and 1008 cover the regions on which the 0th-order light is incident, and on which the +1st-order diffracted light and the −1st-order diffracted light are not incident, when the center of the 0th-order light coincides with the optical axis.

The photosensors 1009 and 1010 are the seventh photosensors disposed on the same side as that of the photosensors 1002 and 1003 with respect to the centerline M-M', and disposed between the photosensors 1001 and 1004. The photosensors 1009 and 1010 cover the regions on which at least the 0th-order light is incident, when the center of the 0th-order light coincides with the optical axis.

The photosensors 1011 and 1012 are the eighth photosensors disposed on the same side as that of the photosensors 1006 and 1007 with respect to the centerline M-M', and disposed between the photosensors 1005 and 1008. The photosensors 1011 and 1012 cover the regions on which at least the 0th-order light is incident, when the center of the 0th-order light coincides with the optical axis.

The photosensors 1009 and 1010 cover the regions on which the overlapped light of the 0th-order light with the +1st-order diffracted light is incident, when the center of the 0th-order light coincides with the optical axis. The photosensors 1011 and 1012 cover the regions on which the overlapped light of the 0th-order light with the −1st-order diffracted light is incident, when the center of the 0th-order light coincides with the optical axis.

In this case, the photosensors 1001, 1004, 1005, and 1008 are positioned on the regions on which mainly the 0th-order light 911 is incident. These photosensors are not limited to be positioned on such regions on which only the 0th-order light 911 is incident, but the +1st-order diffracted light or the −1st-order diffracted light may be incident on these photosensors. In addition, the photosensors 1009 and 1010 mainly receive part of the +1st-order light 912. Similarly, the photosensors 1011 and 1012 mainly receive part of the −1st-order light 913.

A broken-line circle 914 as shown in FIG. 10A indicates the 0th-order light obtained when the object lens 204 is shifted (for ease of illustration, the corresponding +1st-order light and −1st-order light are not shown)

In the present embodiment, let S1001 to S1012 denote the output signals of the photosensors 1001 to 1012, respectively, then the calculation circuit 110 calculates the tracking error signal TE using the following equation.

$$TE=\{(S1002+S1003)-(S1006+S1007)\}-k1\times\{(S1001+S1004)-(S1005+S1008)\}-k2\times\{(S1009+S1010)-(S1011+S1012)\}$$

It should be noted that when the detection lens 205 is configured as an appropriate cylindrical lens, a calculation circuit 111 obtains a focusing error signal (FE) according to the astigmatism method using the following equation.

$$FE=(S1001+S1002+S1009+S1005+S1006+S1011)-(S1003+S1004+S1010+S1007+S1008+S1012)$$

In this case, the sensor array 207 is divided into twelve photosensors 1001 to 1012 in order to illustrate the focusing error signal detection according to the astigmatism method. However, when considering only the function of the tracking error signal detection, the sensor array 207 receives the light incident on the regions A to F as shown in FIG. 10B, respectively, as described below.

Figure 10B:
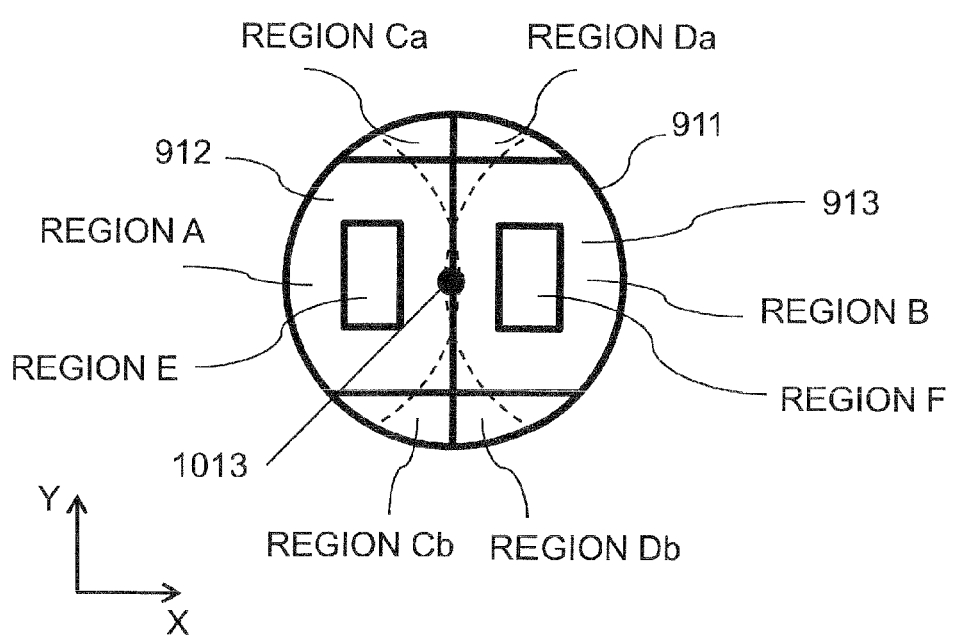
FIG. 10B is a diagram illustrating regions A to F according to the second embodiment, on which reflected light from the recording medium is incident and received by the photosensors.

FIG. 10B is a diagram illustrating regions A to F according to the second embodiment, on which reflected light from the recording medium 101 is incident and received by the photosensors 1001 to 1012. The photosensors 1002 and 1003 receive the light incident on the region A. The photosensors 1006 and 1007 receive the light incident on the region B. The photosensors 1001 and 1004 receive the light incident on the regions Ca and Cb, respectively. The photosensors 1005 and 1008 receive the light incident on the regions Da and Db, respectively. The photosensors 1009 and 1010 receive the light incident on the region E. The photosensors 1011 and 1012 receive the light incident on the region F.

As can be clearly understood from FIGS. 10A and 10B, the region A mainly consists of the overlapped portion of the 0th-order light with the +1st-order diffracted light, excluding the center of the overlapped portion, and the region B mainly consists of the overlapped portion of the 0th-order light with the −1st-order diffracted light, excluding the center of the overlapped portion. In addition, among the regions positioned at both ends in the Y direction, on which mainly the 0th-order light is incident, the regions Ca and Cb are positioned on the side of the region A, and the regions Da and Db are positioned on the side of the region B. In addition, among the regions other than the regions A, B, Ca, Cb, Da, and Db, the region E is positioned on the side of the region A with respect to the centerline M-M', and the region F is positioned on the side of the region B with respect to the centerline M-M'. The region E receives the +1st-order light, and the region F receives the −1st-order light. In this case, let SA to SF denote the output signals of the photosensors receiving the light incident on the regions A to F, respectively, and let k1 and k2 denote predetermined constant coefficients, then the calculation circuit 110 calculates the tracking error signal TE using the following equation.

$$TE=SA-SB-k1(SCa+SCb-SDa-SDb)-k2\times(SE-SF)$$

The tracking servo circuit 107 controls the tracking servo mechanism so as to reduce the tracking error signal TE.

According to the present embodiment, the boundary offset is canceled or reduced by using the output signals of the photosensors 1009 to 1012 receiving the light incident on the regions E and F.

FIG. 11 is a diagram illustrating the tracking offset in the boundary track, occurring when obtaining the tracking error signal using the method according to the present embodiment in the case where information is written or read on or from the recording medium 101 having a groove pitch of 0.45 μm. The "G" in the figure denotes the groove, and the "L" denotes the land. In the case of FIG. 11, left four tracks are unrecorded tracks, and right four tracks are recorded tracks. Here, the land of the fourth track from the left is a boundary track, and it can be seen that the symmetry of the TE waveform deteriorates around the boundary track.

The TE waveform in a broken line indicates the tracking error signal TE in the case of using the APP method. In this case, the offset caused by the object lens shift is canceled or reduced by setting k=1.1. Let "A" denote the positive amplitude of the TE waveform, and "B" denote the negative amplitude of the TE waveform, according to the APP method, then the boundary offset in the boundary track (the fourth track from the left) is obtained using the following equation.

$$\text{Boundary Offset}=50\times(A-B)/(A+B)=-11.8(\%)$$

Since the track pitch of FIG. 11 is as small as 0.225 μm, an influence of adjacent tracks on the boundary track increases, and the boundary offset increases from the case of the BD-RE. In addition, even if properly setting the coefficients k1 and k2 according to the first embodiment (not shown in FIG. 11), substantially the same boundary offset occurs as that in the case of using the APP method.

On the other hand, the TE waveform in a solid line indicates the tracking error signal TE according to the present embodiment. In this case, the offset caused by the object lens shift is canceled or reduced by setting k1=1.2. Further, k2=2 is set in order to reduce the boundary offset. Let "C" denote the positive amplitude of the TE waveform, and "D" denote the negative amplitude of the TE waveform, according to the present embodiment, then the boundary offset in the boundary track (the fourth track from the left) is obtained using the following equation.

$$\text{Boundary Offset}=50\times(C-D)/(C+D)=-7.5(\%)$$

According to the present embodiment, the boundary offset is significantly reduced from the case of using the APP method, i.e., −11.8%. It is possible to achieve more stable tracking servo operation.

It is necessary to appropriately set the positions of the photosensors 1009 to 1012 based on the groove pitch, the groove depth, and further, the complex amplitude of a recording mark, and the like of the recording medium 101. In general, it is possible to reduce the boundary off-track by setting the positions of the photosensors 1009 to 1012 in the vicinity of respective centers of the +1st-order light 912 and the −1st-order light 913.

2-2. Advantageous Effects

As described above, the recording and playing apparatus 100 of the present embodiment writes and reads the information on and from the recording medium 101 having a plurality of tracks disposed at a predetermined pitch. The recording and playing apparatus 100 includes: a light source 201; a photo detector 206; an optical system including a plurality of optical elements for converging the light generated by the light source 201 onto the track of the recording medium 101, and for transmitting the 0th-order light, the +1st-order diffracted light, and the −1st-order diffracted light, which are reflected by the recording medium 101, to the incident surface of the photo detector 206; a tracking servo mechanism for keeping track of the recording medium 101; and a tracking servo circuit 107 for controlling the tracking servo mechanism based on the output signals of the photo detector 206. The photo detector 206 includes photosensors 1001 to 1012 for generating respective output signals depending on the incident light. The photo detector 206 has a centerline M-M' on its incident surface, the centerline M-M' passing through the intersection of the optical axis of the optical system and the incident surface, and extending in the direction corresponding to the tangential direction of the track. The photosensors 1001 to 1004, 1009, and 1010 are disposed on one side with respect to the centerline M-M', and the photosensors 1005 to 1008, 1011, and 1012 are disposed on the other side with respect to the centerline M-M'. The photosensors 1001 and 1004 are disposed such that the photosensors 1002, 1003, 1009, and 1010 are positioned between the photosensors 1001 and 1004 in the direction parallel to the centerline M-M'. The photosensors 1005 and 1008 are disposed such that the photosensors 1006, 1007, 1011, and 1012 are positioned between the photosensors 1005 and 1008 in the direction parallel to the centerline M-M'. When the center of the 0th-order light coincides with the optical axis, the photosensors 1002 and 1003 cover the regions on which the overlapped light of the 0th-order light with the +1st-order diffracted light is incident, the photosensor 1006 and 1007 cover the regions on which the overlapped light of the 0th-order light with the −1st-order diffracted light is incident, each of the photosensors 1001, 1004, 1005, and 1008 covers the region on which the 0th-order light is incident, and on which the +1st-order diffracted light and the −1st-order diffracted light are not incident, and each of the photosensors 1009 to 1012 covers the region on which at least the 0th-order light is incident.

In the present embodiment, the photosensors 1009 and 1010 cover the regions on which the overlapped light of the 0th-order light with the +1st-order diffracted light is incident, when the center of the 0th-order light coincides with the optical axis. The photosensors 1011 and 1012 cover the regions on which the overlapped light of the 0th-order light with the −1st-order diffracted light is incident, when the center of the 0th-order light coincides with the optical axis.

Accordingly, even in the case where the light beams of the +1st-order diffracted light 902 and the −1st-order diffracted light 903 are close to each other because of the small diffraction angle of the recording medium 101, and where most of the region of the 0th-order light 901 is occupied by the region of the +1st-order diffracted light 902 and the region of the −1st-order diffracted light 903, it is possible to reduce the boundary offset in the tracking error signal, occurring when the light generated by the light source 201 is converged on the boundary track between the recorded tracks and the unrecorded tracks of the recording medium 101, thus achieving appropriate tracking of the recording medium 101.

Third Embodiment

A third embodiment will now be described with reference to FIGS. 12A to 13B.

3-1. Configuration

The configurations for a BD-RE having the groove pitch of 0.32 μm is described in the first embodiment, and the configurations for a recording media having the groove pitch of 0.45 μm is described in the second embodiment. A recording medium may have a groove pitch between 0.32 μm and 0.45 μm. In this case, the use of the photosensors 701 to 712 of FIG. 7A or the photosensors 1001 to 1012 of FIG. 10A in order to cancel or reduce the boundary offset leads to the following problem.

Figure 12B:
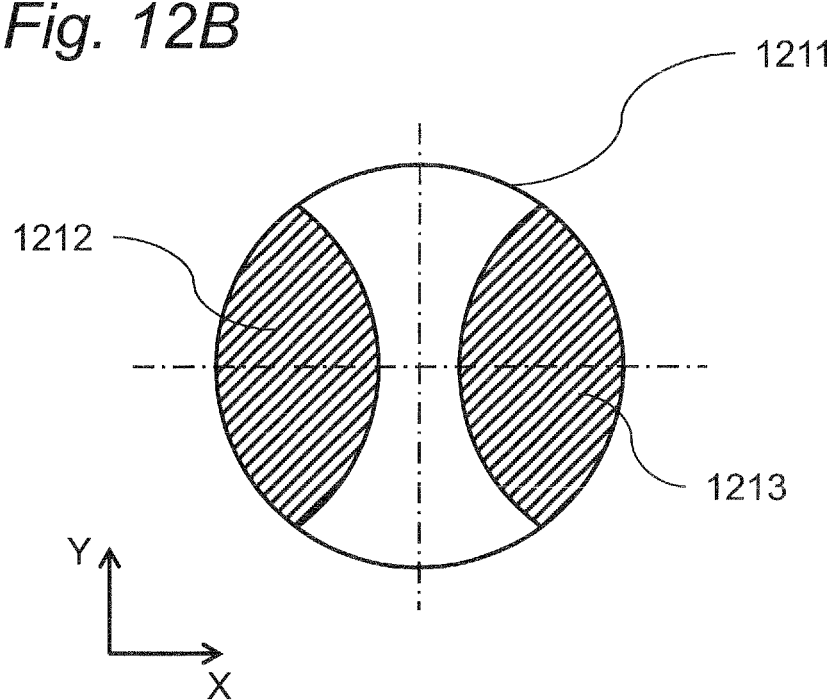
FIG. 12B is a schematic diagram illustrating light reflected by the recording medium and incident on a photo detector.

FIGS. 12A and 12B are schematic diagrams illustrating diffraction of the light from the optical pickup 103, the light being reflected by a recording medium 101 having a groove pitch of 0.39 μm, which is substantially the middle of 0.32 μm and 0.45 μm, and the light being diffracted by grooves of the tracks of the recording medium 101. FIG. 12A illustrates 0th-order light 1201, +1st-order diffracted light 1202, and −1st-order diffracted light 1203. FIG. 12B illustrates the light corresponding to the 0th-order light 1201, the +1st-order diffracted light 1202, and the −1st-order diffracted light 1203 as shown in FIG. 12A, and the light as shown in FIG. 12B having passed through the aperture of the object lens 204, and being incident on the sensor array 207 disposed on the photo detector 206. A circle 1211 indicates the light corresponding to the 0th-order light 1201 (hereinafter referred to as 0th-order light 1211). A hatched portion 1212 indicates the portion where the 0th-order light 1201 overlaps the +1st-order diffracted light 1202. Similarly, a hatched portion 1213 indicates the portion where the 0th-order light 1201 overlaps the −1st-order diffracted light 1203. For ease of notation, the hatched portion 1212 and the hatched portion 1213 may be merely referred to as +1st-order light 1212 and −1st-order light 1213, respectively.

When using the photosensors 709 to 712 according to the first embodiment, on which mainly the 0th-order light is incident, in order to cancel or reduce the boundary offset, the following problem arises. Referring to FIG. 12A, the region of the 0th-order light between the region of the +1st-order diffracted light and the region of the −1st-order diffracted light is narrower than that of FIG. 3A according to the first embodiment. Therefore, the use of a photosensor in the region between the region of the +1st-order diffracted light and the region of the −1st-order diffracted light, on which mainly the 0th-order light is incident, leads to a problem of insufficient reduction in the boundary offset, or a problem of an increase of the coefficient k2, resulting in being more sensitive to dirt on the recording medium 101 and the object lens 204.

When using the photosensors 1009 to 1012 according to the second embodiment, on which mainly the +1st-order light and the −1st-order light are incident, in order to cancel or reduce the boundary offset, the following problem arises. Referring to FIG. 12A, the region of the +1st-order diffracted light and the region of the −1st-order diffracted light are narrower than those of FIG. 9A according to the second embodiment. Therefore, the use of the photosensors in the region of the +1st-order light and the region of the −1st-order light leads to a problem that the amplitude of the tracking error signal obtained based on the difference between the signal detected in response to the +1st-order light and the signal detected in response to the −1st-order light is excessively reduced.

Thus, a recording and playing apparatus 100 of the present embodiment uses a sensor array 207 as shown in FIG. 13A.

FIG. 13A illustrates a configuration of the sensor array 207 according to the present embodiment. FIG. 13A illustrates the 0th-order light 1211, the +1st-order light 1212, and the −1st-order light 1213, which are incident on the sensor array 207, and the center of the 0th-order light 1211 (the optical axis) is set to coincide with a center 207c of the sensor array 207. The sensor array 207 is divided into twelve photosensors 1301 to 1312.

The photosensors 1302 and 1303 are the first photosensors covering the regions on which the overlapped light of the 0th-order light with the +1st-order diffracted light is incident, when the center of the 0th-order light coincides with the optical axis.

The photosensors 1306 and 1307 are the second photosensors covering the regions on which the overlapped light of the 0th-order light with the −1st-order diffracted light is incident, when the center of the 0th-order light coincides with the optical axis.

The photosensors 1301 and 1304 are the third and fourth photosensors disposed on the same side as that of the photosensors 1302 and 1303 with respect to the centerline M-M', and disposed such that the photosensors 1302 and 1303 are positioned between the photosensors 1301 and 1304 in the direction parallel to the centerline M-M'. The photosensors 1301 and 1304 cover the regions on which the 0th-order light is incident, and on which the +1st-order diffracted light and the −1st-order diffracted light are not incident, when the center of the 0th-order light coincides with the optical axis.

The photosensors 1308 and 1305 are the fifth and sixth photosensors disposed on the same side as that of the photosensors 1306 and 1307 with respect to the centerline M-M', and disposed such that the photosensors 1306 and 1307 are positioned between the photosensors 1308 and 1305 in the direction parallel to the centerline M-M'. The photosensors 1305 and 1308 cover the regions on which the 0th-order light is incident, and on which the +1st-order diffracted light and the −1st-order diffracted light are not incident, when the center of the 0th-order light coincides with the optical axis.

The photosensors 1309 and 1310 are the seventh photosensors disposed on the same side as that of the photosensors 1302 and 1303 with respect to the centerline M-M', and disposed between the photosensors 1301 and 1304. The photosensors 1309 and 1310 cover the regions on which at least the 0th-order light is incident, when the center of the 0th-order light coincides with the optical axis.

The photosensors 1311 and 1312 are the eighth photosensors disposed on the same side as that of the photosensors 1306 and 1307 with respect to the centerline M-M', and disposed between the photosensors 1305 and 1308. The photosensors 1311 and 1312 cover the regions on which at least the 0th-order light is incident, when the center of the 0th-order light coincides with the optical axis.

The photosensors 1309 and 1310 cover the regions on which the overlapped light of the 0th-order light with the +1st-order diffracted light is incident, and the region on which the 0th-order light is incident, and on which the +1st-order diffracted light and the −1st-order diffracted light are not incident, when the center of the 0th-order light coincides with the optical axis. The photosensors 1311 and 1312 cover the regions on which the overlapped light of the 0th-order light with the −1st-order diffracted light is incident, and the region on which the 0th-order light is incident, and on which the +1st-order diffracted light and the −1st-order diffracted light are not incident, when the center of the 0th-order light coincides with the optical axis.

In this case, the photosensors 1301, 1304, 1305, and 1308 are positioned on the regions on which mainly the 0th-order light 1211 is incident. These photosensors are not limited to be positioned on such regions on which only the 0th-order light 1211 is incident, but the +1st-order diffracted light or the −1st-order diffracted light may be incident on these photosensors. In addition, each of the photosensors 1309 and 1310 receives both the 0th-order light 1211 and the +1st-order light 1212. Similarly, each of the photosensors 1311 and 1312 receives both the 0th-order light 1211 and the −1st-order light 1213.

A broken-line circle 1214 as shown in FIG. 13A indicates the 0th-order light obtained when the object lens 204 is shifted (for ease of illustration, the corresponding +1st-order light and −1st-order light are not shown).

In the present embodiment, let S1301 to S1312 denote the output signals of the photosensors 1301 to 1312, respectively, a calculation circuit 110 calculates the tracking error signal TE using the following equation.

$$TE=\{(S1302+S1303)-(S1306+S1307)\}-k1\times\{(S1301+S1304)-(S1305+S1308)\}-k2\times\{(S1309+S1310)-(S1311+S1312)\}$$

It should be noted that when the detection lens 205 is configured as an appropriate cylindrical lens, the calculation circuit 111 obtains a focusing error signal (FE) according to the astigmatism method using the following equation.

$$FE=(S1301+S1302+S1309+S1305+S1306+S1311)-(S1303+S1304+S1310+S1307+S1308+S1312)$$

In this case, the sensor array 207 is divided into twelve photosensors 1301 to 1312 in order to illustrate the focusing error signal detection according to the astigmatism method. However, when considering only the function of the tracking error signal detection, the sensor array 207 receives the light incident on the regions A to F as shown in FIG. 13B, respectively, as described below.

Figure 13B:
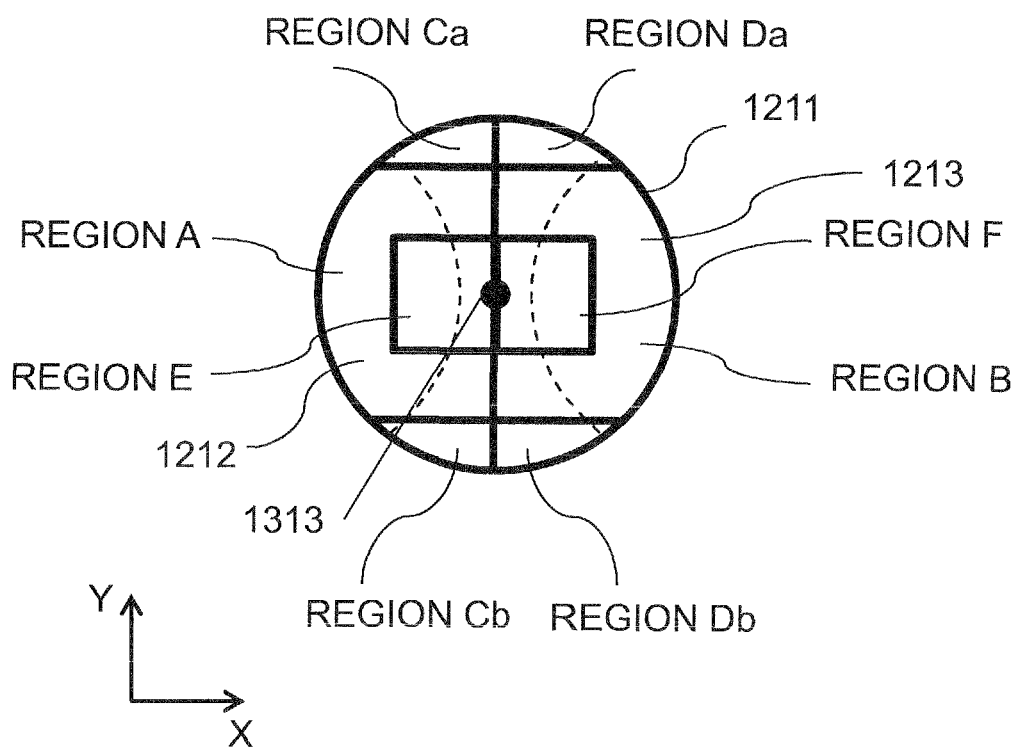
FIG. 13B is a diagram illustrating regions A to F according to the third embodiment, on which reflected light from the recording medium is incident and received by the photosensors.

FIG. 13B is a diagram illustrating regions A to F according to the third embodiment, on which reflected light from the recording medium 101 is incident and received by the photosensors 1301 to 1312. The photosensors 1302 and 1303 receive the light incident on the region A. The photosensors 1306 and 1307 receive the light incident on the region B. The photosensors 1301 and 1304 receive the light incident on the regions Ca and Cb, respectively. The photosensors 1305 and 1308 receive the light incident on the regions Da and Db, respectively. The photosensors 1309 and 1310 receive the light incident on the region E. The photosensors 1311 and 1312 receive the light incident on the region F.

As can be clearly understood from FIGS. 13A and 13B, the region A mainly consists of the overlapped portion of the 0th-order light with the +1st-order diffracted light, excluding the part from the vicinity of the center of the overlapped portion to the centerline M-M', and the region B mainly consists of the overlapped portion of the 0th-order light with the −1st-order diffracted light, excluding the part from the vicinity of the center of the overlapped portion to the centerline M-M'. In addition, among the regions positioned at both ends in the Y direction, on which mainly the 0th-order light is incident, the regions Ca and Cb are positioned on the side of the region A, and the regions Da and Db are positioned on the side of the region B. In addition, among the regions other than the regions A, B, Ca, Cb, Da, and Db, the region E is positioned on the side of the region A with respect to the centerline M-M', and the region F is positioned on the side of the region B with respect to the centerline M-M'. The region E receives both the 0th-order light and the +1st-order light, and the region F receives both the 0th-order light and the −1st-order light. In this case, let SA to SF denote the output signals of the photosensors receiving the light incident on the regions A to F, respectively, then the calculation circuit 110 calculates the tracking error signal TE using the following equation.

$$TE=SA-SB-k1\times(SCa+SCb-SDa-SDb)-k2\times(SE-SF)$$

The tracking servo circuit 107 controls the tracking servo mechanism so as to reduce the tracking error signal TE.

According to the present embodiment, the boundary offset is canceled or reduced by using the output signals of the photosensors 1309 to 1312 receiving the light incident on the regions E and F.

In this case, it is possible to reduce the boundary offset by appropriately setting the coefficients k1 and k2, with a smaller coefficient k2 than that of the first embodiment, and with a smaller decrease in the TE amplitude than that of the second embodiment, thus achieving more stable tracking servo operation.

3-2. Advantageous Effects

As described above, the recording and playing apparatus 100 of the present embodiment writes and reads the information on and from the recording medium 101 having a plurality of tracks disposed at a predetermined pitch. The recording and playing apparatus 100 includes: a light source 201; a photo detector 206; an optical system including a plurality of optical elements for converging the light generated by the light source 201 onto the track of the recording medium 101, and for transmitting the 0th-order light, the +1st-order diffracted light, and the −1st-order diffracted light, which are reflected by the recording medium 101, to the incident surface of the photo detector 206; a tracking servo mechanism for keeping track of the recording medium 101; and a tracking servo circuit 107 for controlling the tracking servo mechanism based on the output signals of the photo detector 206. The photo detector 206 includes photosensors 1301 to 1312 for generating respective output signals depending on the incident light. The photo detector 206 has a centerline M-M' on its incident surface, the centerline M-M' passing through the intersection of the optical axis of the optical system and the incident surface, and extending in the direction corresponding to the tangential direction of the track. The photosensors 1301 to 1304, 1309, and 1310 are disposed on one side with respect to the centerline M-M', and the photosensors 1305 to 1308, 1311, and 1312 are disposed on the other side with respect to the centerline M-M'. The photosensors 1301 and 1304 are disposed such that the photosensors 1302, 1303, 1309, and 1310 are positioned between the photosensors 1301 and 1304 in the direction parallel to the centerline M-M'. The photosensors 1305 and 1308 are disposed such that the photosensors 1306, 1307, 1311, and 1312 are positioned between the photosensors 1305 and 1308 in the direction parallel to the centerline M-M'. When the center of the 0th-order light coincides with the optical axis, the photosensors 1302 and 1303 cover the regions on which the overlapped light of the 0th-order light with the +1st-order diffracted light is incident, the photosensor 1306 and 1307 cover the regions on which the overlapped light of the 0th-order light with the −1st-order diffracted light is incident, each of the photosensors 1301, 1304, 1305, and 1308 covers the region on which the 0th-order light is incident, and on which the +1st-order diffracted light and the −1st-order diffracted light are not incident, and each of the photosensors 1309 to 1312 covers the region on which at least the 0th-order light is incident.

In the present embodiment, the photosensors 1309 and 1310 cover the regions on which the overlapped light of the 0th-order light with the +1 st-order diffracted light is incident, and the region on which the 0th-order light is incident, and on which the +1st-order diffracted light and the −1 st-order diffracted light are not incident, when the center of the 0th-order light coincides with the optical axis. The photosensors 1311 and 1312 cover the regions on which the overlapped light of the 0th-order light with the −1st-order diffracted light is incident, and the region on which the 0th-order light is incident, and on which the +1st-order diffracted light and the −1st-order diffracted light are not incident, when the center of the 0th-order light coincides with the optical axis.

Accordingly, even in the case of the recording medium 101 not suited to photosensors on which only the 0th-order light is incident, or on which only the +1st-order light and the −1st-order light are incident, the photosensors being used in order to cancel or reduce the boundary offset, it is possible to reduce the boundary offset in the tracking error signal, occurring when the light generated by the light source 201 is converged on the boundary track between the recorded tracks and the unrecorded tracks of the recording medium 101, thus achieving appropriate tracking of the recording medium 101.

Other Embodiments

The first to third embodiments have been described above as examples of the techniques disclosed by this application. However, the techniques of this disclosure are not limited thereto, and are applicable to embodiments with appropriate modification, replacement, addition, omission, and so on. The elements described in the first to third embodiments can be combined to form a new embodiment.

Thus, other exemplary embodiments will be described below.

(1) Although the BD-RE is used as the recording medium 101 in the first embodiment, the recording medium 101 is not limited thereto. Let $\lambda$ denote the wavelength of the light from the light source 201, let "P" denote the pitch of the grooves or pit sequences of the recording medium 101 in the tracking direction, and let "NA" denote the numerical aperture of the object lens 204, then the first embodiment is particularly effective in the recording medium 101 satisfying the condition:

$\sin(\lambda/P) \geq 1.1 \times NA$.

Upon writing and reading the information on and from the recording medium 101 satisfying this condition, the tracking servo circuit 107 sets the value of the coefficient k2 determined in advance when designing the recording and playing apparatus 100, and the like.

In addition, upon writing and reading the information on and from the recording medium 101 satisfying the condition:

$\sin(\lambda/P) < 1.1 \times NA$, the tracking servo circuit 107 can reduce the decrease in the TE amplitude by setting k2n≈−1.

Figure 14:
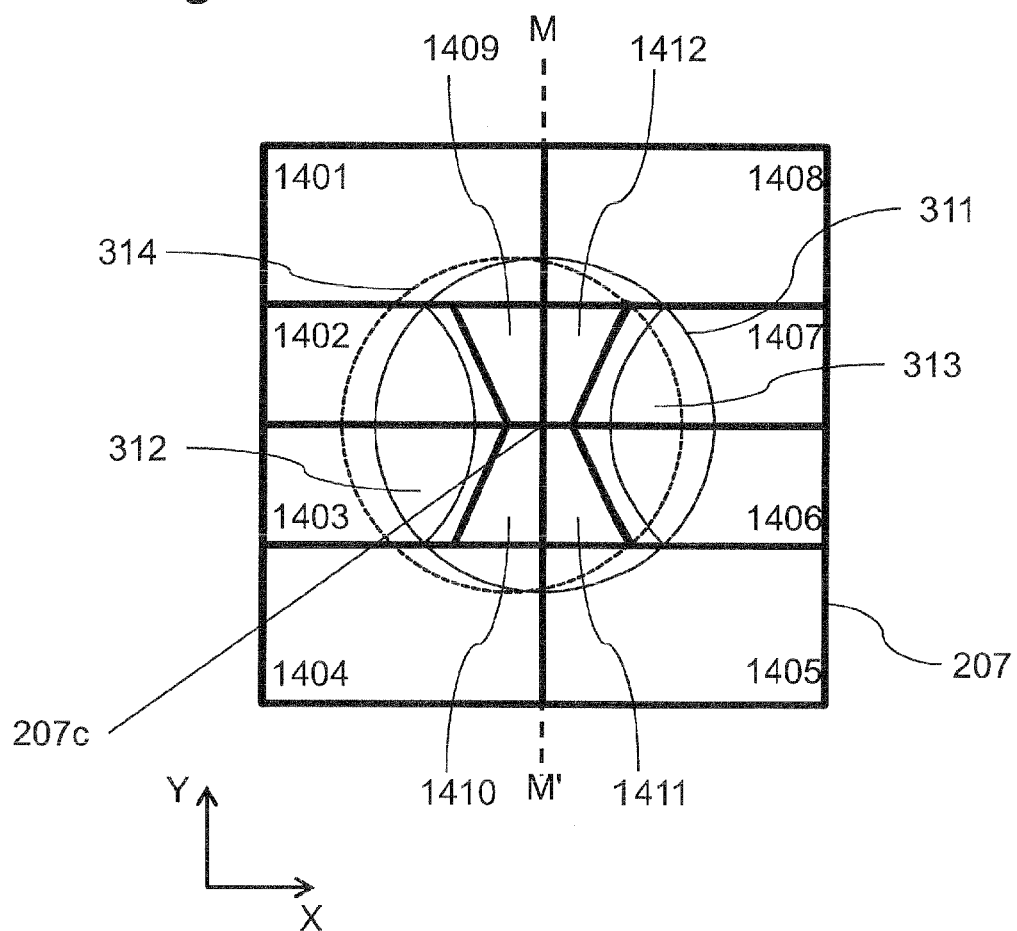
FIG. 14 is a diagram illustrating a configuration of photosensors according to another embodiment.
Figure 15:
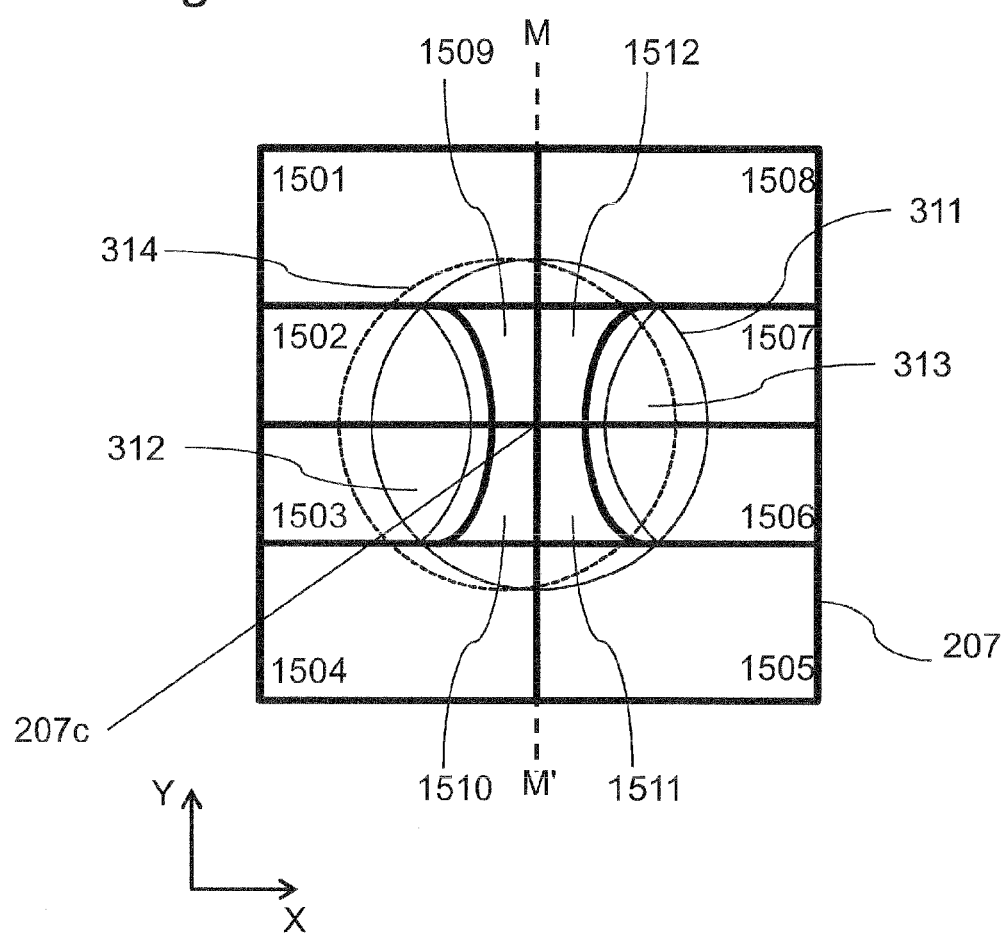
FIG. 15 is a diagram illustrating a configuration of photosensors according to another embodiment.

In addition, the arrangement of a plurality of photosensors in a sensor array 207 is not limited to the example of FIG. 7A. Various modifications such as those of FIG. 14, 15, or the like may be employed. The sensor array of FIG. 14 includes photosensors 1401 to 1412 corresponding to the photosensors 701 to 712 of FIG. 7A, respectively. The sensor array of FIG. 15 includes photosensors 1501 to 1512 corresponding to the photosensors 701 to 712 of FIG. 7A, respectively. Even when using the sensor arrays of FIGS. 14 and 15, it is possible to more stably keep track of the recording medium 101 than the prior art, in a manner similar to the sensor array of FIG. 7A, when writing and reading information on and from the recording medium 101.

(2) Although the recording medium 101 having the groove pitch of 0.45 μm is used in the second embodiment, the recording medium 101 is not limited thereto. Let $\lambda$ denote the wavelength of the light from the light source 201, let "P" denote the pitch of the grooves or pit sequences of the recording medium 101 in the tracking direction, and let "NA" denote the numerical aperture of the object lens 204, then the second embodiment is particularly effective in the recording medium 101 satisfying the condition:

$\sin(\lambda/P) < NA$.

Upon writing and reading the information on and from the recording medium 101 satisfying this condition, the tracking servo circuit 107 sets the value of the coefficient k2 determined in advance when designing the recording and playing apparatus 100, and the like.

In addition, upon writing and reading the information on and from the recording medium 101 satisfying the condition:

$\sin(\lambda/P) \geq NA$, the tracking servo circuit 107 can reduce the decrease in the TE amplitude by setting k2≈−1.

In addition, the arrangement of a plurality of photosensors in the sensor array 207 is not limited to the example of FIG. 10A. Various modifications such as those of FIG. 16, 17, or the like may be employed. The sensor array of FIG. 16 includes photosensors 1601 to 1612 corresponding to the photosensors 1001 to 1012 of FIG. 10A, respectively. The sensor array of FIG. 17 includes photosensors 1701 to 1712 corresponding to the photosensors 1001 to 1012 of FIG. 10A, respectively. Even when using the sensor arrays of FIGS. 16 and 17, it is possible to more stably keep track of the recording medium 101 than the prior art, in a manner similar to the sensor array of FIG. 10A, when writing and reading information on and from the recording medium 101.

(3) Although the recording medium 101 having the groove pitch of 0.39 μm is used in the third embodiment, the recording medium 101 is not limited thereto. Let $\lambda$ denote the wavelength of the light from the light source 201, let "P" denote the pitch of the grooves or pit sequences of the recording medium 101 in the tracking direction, and let "NA" denote the numerical aperture of the object lens 204, then the third embodiment is particularly effective in the recording medium 101 satisfying the condition:

$$0.9 \times NA \leq \sin(\lambda/P) < 1.2 \times NA.$$

Upon writing and reading the information on and from the recording medium 101 satisfying this condition, the tracking servo circuit 107 sets the value of the coefficient k2 determined in advance when designing the recording and playing apparatus 100, and the like.

In addition, the arrangement of a plurality of photosensors in the sensor array 207 is not limited to the example of FIG. 13A. For example, as shown in FIGS. 18A to 18D, the photosensors for detecting signals for canceling or reducing the boundary offset may be further divided into a plurality of photosensors so as to separately receive the 0th-order light, the +1st-order light, and the −1st-order light. At first, an exemplary case will be described with reference to FIGS. 18A to 18C, in which each of the photosensors 1309 to 1312 of FIG. 13A is further divided into two photosensors.

Figure 18A:
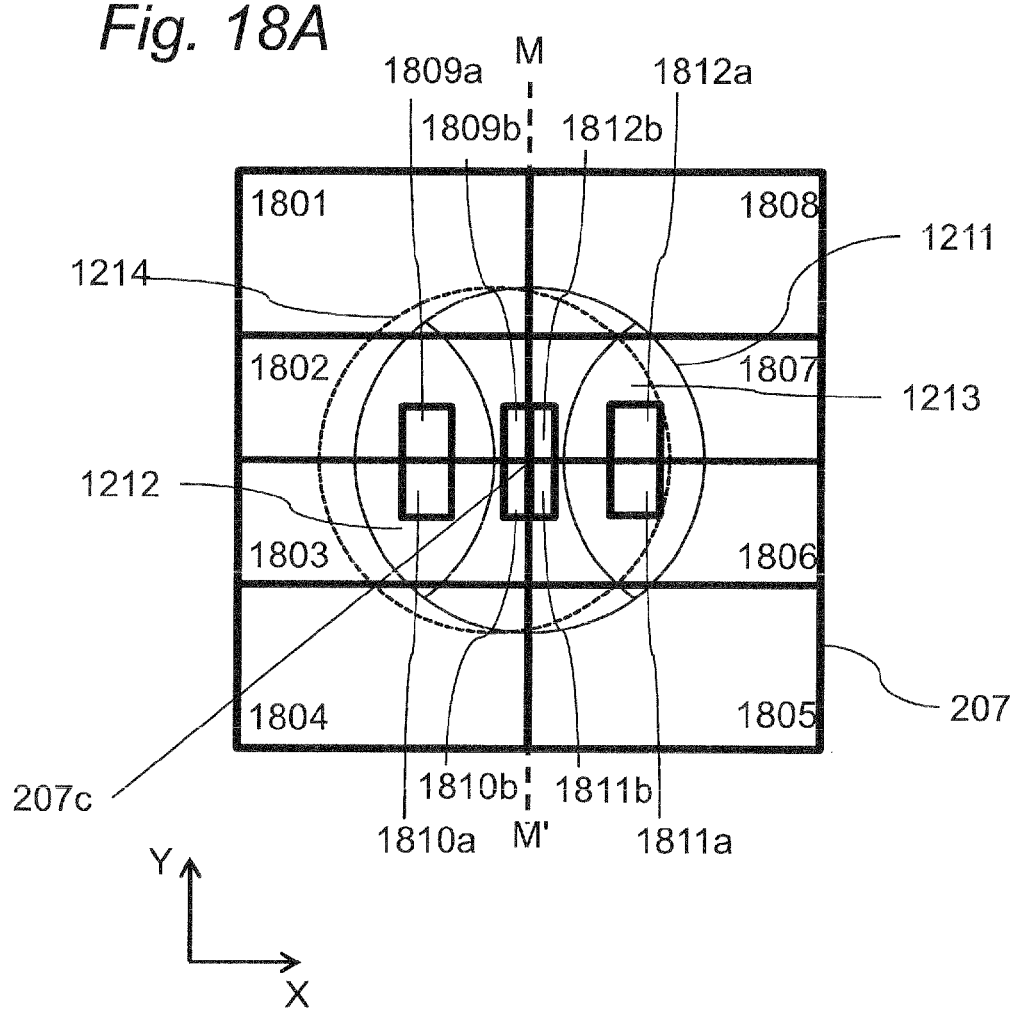
FIG. 18A is a diagram illustrating a configuration of photosensors according to another embodiment.

FIG. 18A illustrates another configuration of the sensor array 207. The sensor array 207 is divided into 16 photosensors 1801 to 1812b. The photosensors 1801 to 1808 correspond to the photosensors 1301 to 1308 of FIG. 13A, respectively. The photosensors 1809a and 1809b correspond to the photosensor 1309 of FIG. 13A, and the photosensors 1810a and 1810b correspond to the photosensor 1310 of FIG. 13A. The photosensors 1809a and 1810a cover the regions on which the overlapped light of the 0th-order light with the +1st-order diffracted light is incident, when the center of the 0th-order light coincides with the optical axis. The photosensors 1809b and 1810b cover the regions on which the 0th-order light is incident, and on which the +1st-order diffracted light and the −1st-order diffracted light are not incident, when the center of the 0th-order light coincides with the optical axis. The photosensors 1811a and 1811b correspond to the photosensor 1311 of FIG. 13A, and the photosensors 1812a and 1812b correspond to the photosensor 1312 of FIG. 13A. The photosensors 1811a and 1812a cover the regions on which the overlapped light of the 0th-order light with the −1st-order diffracted light is incident, when the center of the 0th-order light coincides with the optical axis. The photosensors 1811b and 1812b cover the regions on which the 0th-order light is incident, and on which the +1st-order diffracted light and the −1st-order diffracted light are not incident, when the center of the 0th-order light coincides with the optical axis.

In the present embodiment, let S1801 to S1812b denote the output signals of the photosensors 1801 to 1812b, respectively, the calculation circuit 110 calculates the tracking error signal TE using the following equation.

$$TE=\{(S1802+S1803)-(S1806+S1807)\}-k1\times\{(S1801+S1804)-(S1805+S1808)\}-k2\times\{(S1809a+S1809b+S1810a+S1810b)-(S1811a+S1811b+S1812a+S1812b)\}$$

It should be noted that when the detection lens 205 is configured as an appropriate cylindrical lens, the calculation circuit 111 calculates a focusing error signal (FE) according to the astigmatism method using the following equation.

$$FE=(S1801+S1802+S1809a+S1809b+S1805+S1806+S1811a+S1811b)-(S1803+S1804+S1810a+S1810b+S1807+S1808+S1812a+S1812b)$$

Figure 18B:
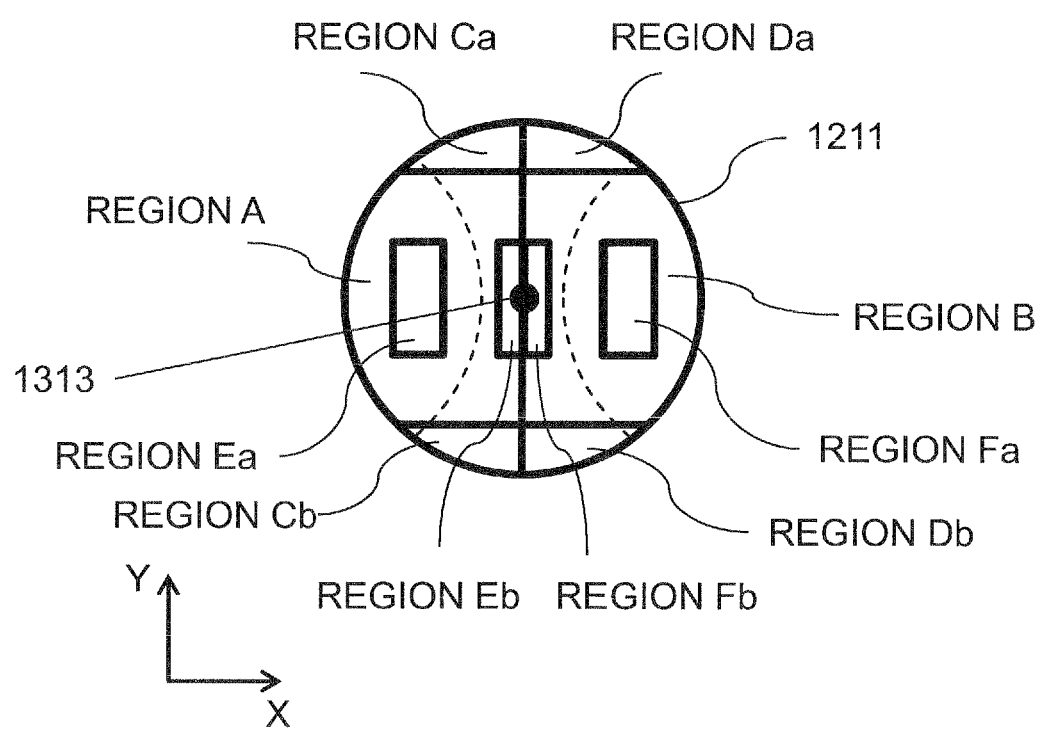
FIG. 18B is a diagram illustrating regions A to Fb according to another embodiment, on which reflected light from the recording medium is incident and received by the photosensors.

In this case, the sensor array 207 is divided into 16 photosensors 1801 to 1812b in order to illustrate the focusing error signal detection according to the astigmatism method. However, when considering only the function of the tracking error signal detection, the sensor array 207 receives the light incident on the regions A to Fb as shown in FIG. 18B, respectively, as described below. The photosensors 1802 and 1803 receive the light incident on the region A. The photosensors 1806 and 1807 receive the light incident on the region B. The photosensors 1801 and 1804 receive the light incident on the regions Ca and Cb, respectively. The photosensors 1805 and 1808 receive the light incident on the regions Da and Db, respectively. The photosensors 1809a and 1810a receive the light incident on the region Ea. The photosensors 1809b and 1810b receive the light incident on the region Eb. The photosensors 1811a and 1812a receive the light incident on the region Fa. The photosensors 1811b and 1812b receive the light incident on the region Fb. In this case, the combination of the regions Ea and Eb corresponds to the region E of the third embodiment, and the combination of the regions Fa and Fb corresponds to the region F of the third embodiment.

As can be clearly understood from FIGS. 18A and 18B, the region A mainly consists of the portion where the 0th-order light overlaps the +1st-order diffracted light, and the region B mainly consists of the portion where the 0th-order light overlaps the −1st-order diffracted light. In addition, among the regions positioned at both ends in the Y direction, on which mainly the 0th-order light is incident, the regions Ca and Cb are positioned on the side of the region A, and the regions Da and Db are positioned on the side of the region B. In addition, the region Ea is the center of the portion where mainly the 0th-order light overlaps the +1st-order diffracted light. The region Eb is the region adjacent to the centerline M-M' on the side of the region Ea, among the regions on which mainly the 0th-order light is incident. The region Fa is the center of the portion where mainly the 0th-order light overlaps the −1st-order diffracted light. The region Fb is the region adjacent to the centerline M-M' on the side of the region Fa, among the regions on which mainly the 0th-order light is incident. The region E consists of the region Ea on which the +1st-order light is incident, and the region Eb on which the 0th-order light is incident, positioned on the side of the region A with respect to the centerline M-M', among the regions other than the regions A, B, Ca, Cb, Da, and Db. The region F consists of the region Fa on which the −1st-order light is incident, and the region Fb on which the 0th-order light is incident, positioned on the side of the region B with respect to the centerline M-M', among the regions other than the regions A, B, Ca, Cb, Da, and Db. In this case, let SA to SFb denote the output signals of the photosensors receiving the light incident on the regions A to Fb, respectively, then the calculation circuit 110 calculates the tracking error signal TE using the following equation.

$$TE=SA-SB-k1\times(SCa+SCb-SDa-SDb)-k2\times(SEa+SEb-SFa-SFb)$$

By this calculation, it is possible to reduce the boundary offset in the tracking error signal, occurring when the light generated by the light source 201 is converged on the boundary track between the recorded tracks and the unrecorded tracks of the recording medium 101, thus achieving appropriate tracking of the recording medium 101, in a manner similar to those of the third embodiment.

Figure 18C:
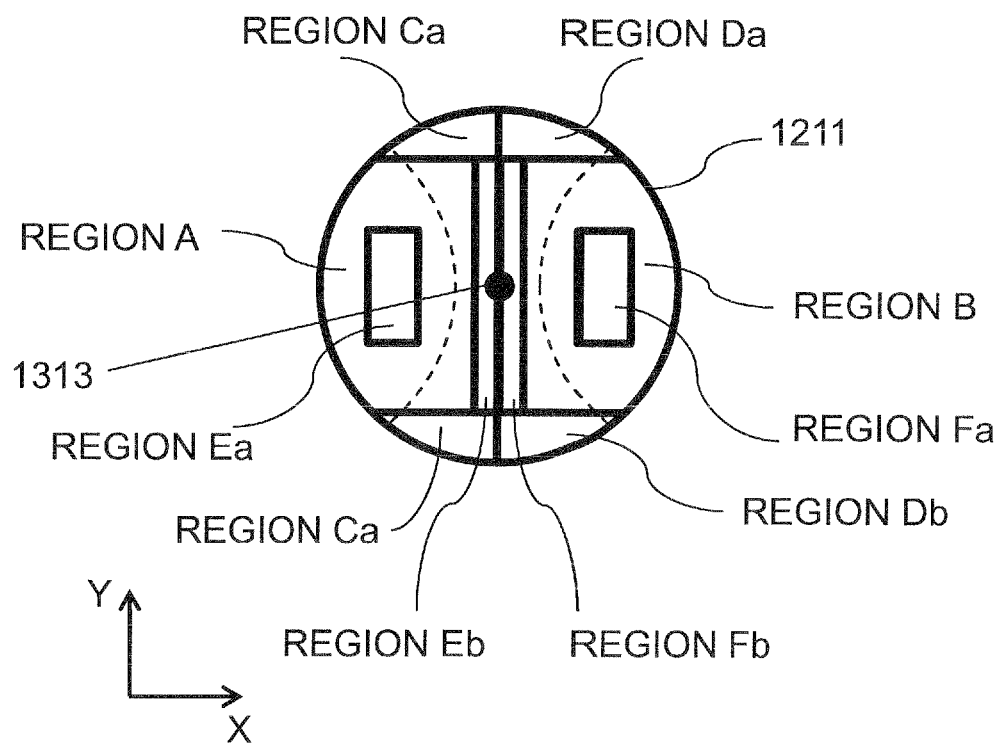
FIG. 18C is a diagram illustrating regions A to Fb according to another embodiment, on which reflected light from the recording medium is incident and received by the photosensors.

FIG. 18C illustrates an example of a configuration where the region Eb is extended to the regions Ca and Cb, and the region Fb is extended to the regions Da and Db. Even when each photosensor is configured so as to receive the light incident on the regions A to Fb of FIG. 18C, it is possible to achieve appropriate tracking of the recording medium 101 in a manner similar to that of the case of FIG. 18B.

FIG. 18D illustrates a case where each of the photosensors 1309 to 1312 of FIG. 13A is further divided into three photosensors. The sensor array of FIG. 18D includes photosensors 1809c to 1812c, in addition to the photosensors 1801 to 1812b of FIG. 18A. Each of the photosensors 1809c and 1810c covers the region on which the overlapped light of the 0th-order light with the +1st-order diffracted light is incident, and the region on which the 0th-order light is incident, and on which the +1st-order diffracted light and the −1st-order diffracted light are not incident, when the center of the 0th-order light coincides with the optical axis. Each of the photosensors 1811c and 1812c covers the region on which the overlapped light of the 0th-order light with the −1st-order diffracted light is incident, and the region on which the 0th-order light is incident, and on which the +1st-order diffracted light and the −1st-order diffracted light are not incident, when the center of the 0th-order light coincides with the optical axis. Even when the photosensors for detecting the signals for canceling or reducing the boundary offset are divided as shown in FIG. 18D, or divided into further more photosensors, it is possible to achieve appropriate tracking of the recording medium 101 in a manner similar to those of the cases of FIGS. 18A to 18C.

(4) It is possible to provide a further modification of the embodiments of FIGS. 18A to 18C, capable of independently outputting the signals in response to the light incident on the regions Ea, Eb, Fa, and Fb of the sensor array 207, and selectively calculate the signals, as described below.

In order to generate signals for canceling or reducing the boundary offset, only the region Ea, only the region Eb, or the region Ea plus region Eb may be selected from the region Ea and the region Eb, and only the region Fa, only the region Fb, or the region Fa plus region Fb may be selected from the region Fa and the region Fb.

In the present embodiment, for example, when using the recording medium 101 satisfying the condition:

$$\sin(\lambda/P) \geq 1.1 \times NA,$$

the regions Eb and Fb may be selected in order to generate signals for canceling or reducing the boundary offset.

In addition, when using the recording medium 101 satisfying the condition:

$$\sin(\lambda/P) < NA,$$

the regions Ea and Fa may be selected in order to generate signals for canceling or reducing the boundary offset.

In addition, when using the recording medium 101 satisfying the condition:

$$NA \leq \sin(\lambda/P) < 1.1 \times NA,$$

the region Ea plus the region Eb, and the region Fa plus the region Fb may be selected in order to generate signals for canceling or reducing the boundary offset.

Accordingly, it is possible to more accurately reduce the boundary offset of a variety of the recording media 101, by selecting the photosensors used for generating signals for canceling or reducing the boundary offset, depending on the type of the recording medium 101 (such as the groove pitch, the groove depth, the characteristics of the recording film (reflectivity, phase, and the like), rand by changing the range of the photosensors. Thus, it is possible to achieve appropriate tracking of the recording medium 101.

Even when the photosensors for detecting the signals for canceling or reducing the boundary offset are divided as shown in FIG. 18D, or divided into further more photosensors, it is similarly possible to select the photosensors used for generating signals for canceling or reducing the boundary offset, and change the ranges of the photosensors.

In addition, a signal obtained from the region not selected for generating signals for canceling or reducing the boundary offset, among the regions Ea and Eb, may be added to the signal obtained from the region A. A signal obtained from the region not selected for generating signals for canceling or reducing the boundary offset, among the regions Fa and Fb, may be added to the signal obtained from the region B. Thus, changing the ranges of the region E (regions Ea and Eb) and the region F (regions Fa and Fb) is equivalent to dividing the ranges of the regions A and B and changing the ranges of the regions A and B depending on the type of the recording medium 101.

(5) It is possible to provide a further modification of the embodiments of FIGS. 18A to 18C, capable of independently outputting the signals from the regions Ea, Eb, Fa, and Fb of the sensor array 207, and selectively calculate the signals, as described below.

Let SA to SFb denote the output signals of the photosensors receiving the light incident on the regions A to Fb, respectively, then the calculation circuit 110 calculates the tracking error signal TE using the following equation.

$$TE = SA - SB - k1 \times (SCa + SCb - SDa - SDb) - k2a \times (SEa - SFa) - k2b \times (SEb - SFb)$$

It is possible to more accurately reduce the boundary offset of a variety of the recording media 101, by appropriately setting the values of constant coefficients k2a and k2b, depending on the type of the recording medium 101 (the groove pitch, the groove depth, the characteristics of the recording film, and the like).

It should be noted that even when the photosensors for detecting the signals for canceling or reducing the boundary offset are divided as shown in FIG. 18D, or divided into further more photosensors, it is similarly possible to calculate the tracking error signal TE. Let SEa, SEb, . . . , and SEn denote the signal levels of a plurality of output signals corresponding to a plurality of regions obtained by dividing the region E, respectively, let SFa, SFb, . . . , and SFn denote the signal levels of a plurality of output signals corresponding to a plurality of regions obtained by dividing the region F, respectively, and let k2a, k2b, . . . , and k2n denote predetermined constant coefficients, then the tracking error signal TE is obtained using the following equation.

$$TE = SA - SB - k1 \times (SCa + SCb - SDa - SDb) - k2a \times (SEa - SFa) - k2b \times (SEb - SFb) - \ldots - k2n \times (SEn - SFn)$$

The tracking servo circuit 107 controls the tracking servo mechanism so as to reduce the tracking error signal TE.

Figure 19:
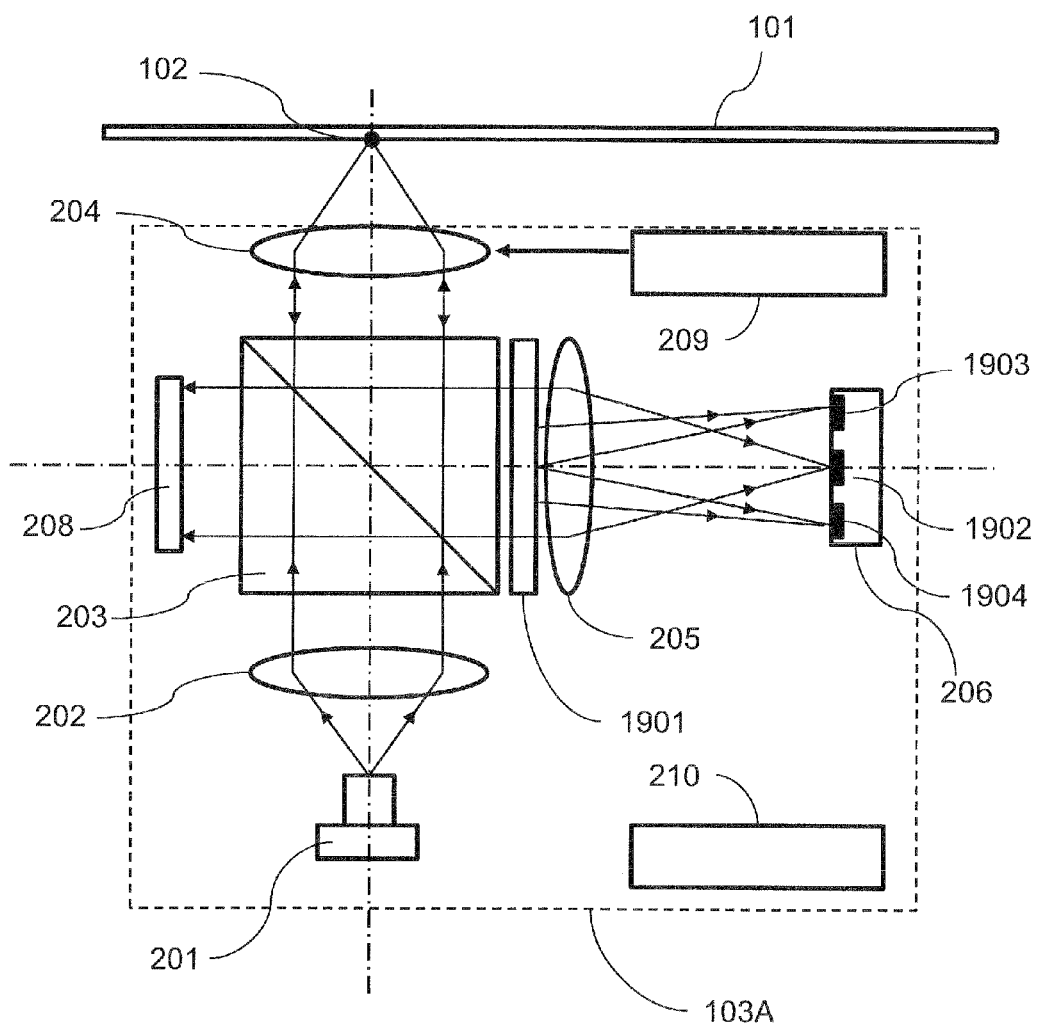
FIG. 19 is a diagram illustrating a configuration of an optical pickup according to another embodiment.

(6) FIG. 19 is an exemplary configuration of an optical pickup 103A using a diffraction grating 1901. The light reflected by the beam splitter 203 is separated into 0th-order transmitted light and diffracted light by the diffraction grating 1901. The 0th-order transmitted light is incident on a photosensor 1902 disposed on the photo detector 206. In this case, when the detection lens 205 is a cylindrical lens and the photosensor 1902 is further divided into four photosensors, it is possible to obtain a focusing error signal from output signals of the photosensor 1902 according to the astigmatism method. The diffraction grating 1901 diffracts the light of each of the regions A to F. For ease of illustration, FIG. 19 schematically illustrates only two beams of diffracted light of regions E and F. The diffracted light of the region E is incident on a photosensor 1903, and the diffracted light of the region F is incident on a photosensor 1904. The photosensors 1903 and 1904 generate output signals SE and SF of the regions E and F, respectively. Although not shown in FIG. 19, the same also applies to the regions A to D.

Thus, there are the following advantages in spatially separating the regions A to F using the diffraction grating 1901. Since the focusing error signal and the tracking error signal are detected by using different photosensors, it is possible to design the photosensors and the optical system with increased degrees of freedom. In addition, it is possible to optimize the characteristics of the photosensors for each of the focusing error signal and the tracking error signal. Further, in the case where, for example, the region E is included in the region A as shown in FIG. 10B of the second embodiment, a complex wiring may be needed for the photosensors 1009 and 1010 of the region E. However, it is possible to eliminate the complexity in the wiring by diffracting the light into different positions on the photo detector 206 using the diffraction grating 1901, and receiving the light using independent photosensors arranged in an arbitrary layout.

It should be noted that although FIG. 19 shows the photosensors 1903 and 1904 for the diffracted light, which are positioned above and below the photosensor 1902 for the 0th-order transmitted light, for ease of illustration, it is actually possible to arrange a plurality of photosensors on the photo detector 206 in a two-dimensional manner.

Although FIG. 19 illustrates a blazed grating where one beam of diffracted light is diffracted from each region, it is also possible to use a binary grating where two beams of diffracted light (+1st-order diffracted light and −1st-order diffracted light) are diffracted from each region. In this case, it is necessary to appropriately set the diffraction angle of each region such that diffracted light of a certain region is not incident on photosensors of another region.

Figure 20A:
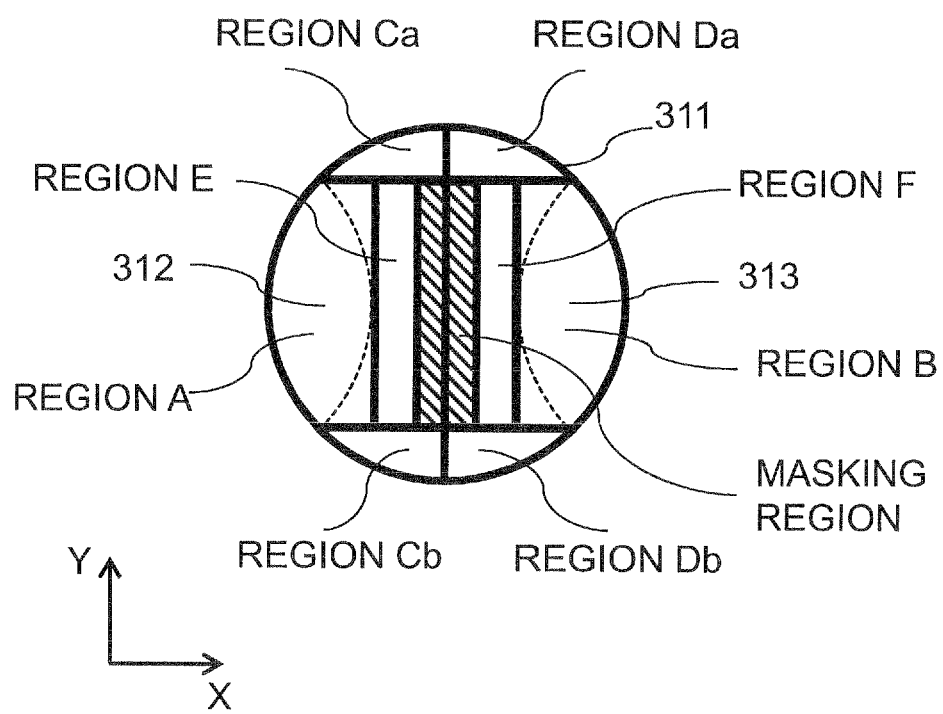
FIG. 20A is a diagram illustrating a mask in the aperture according to another embodiment.
Figure 20B:
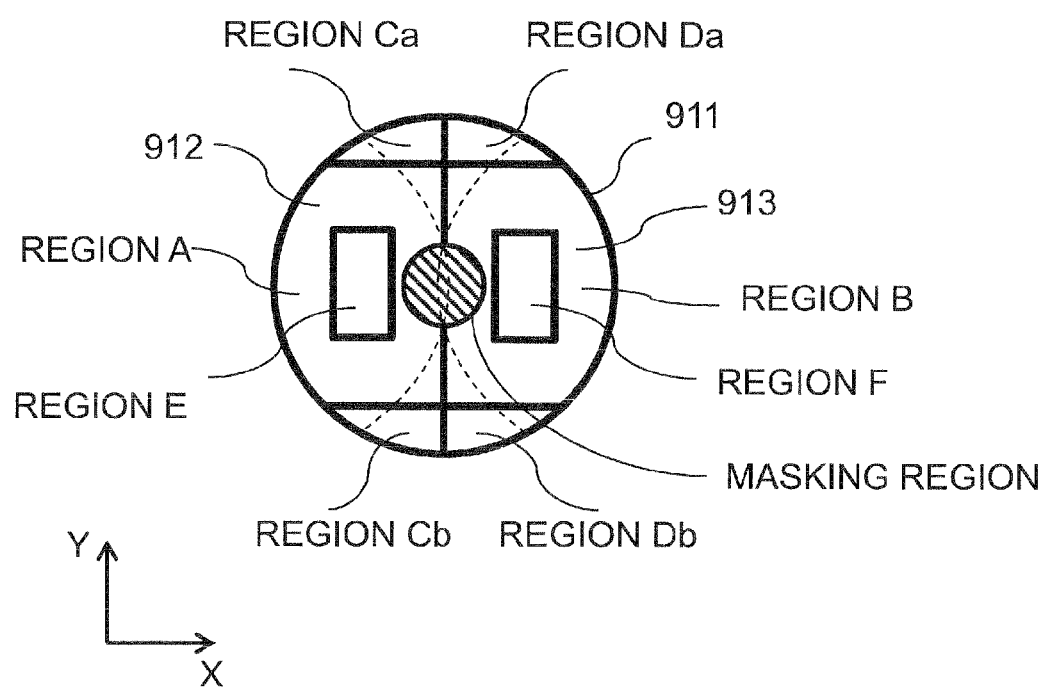
FIG. 20B is a diagram illustrating a mask in the aperture according to another embodiment.
Figure 20C:
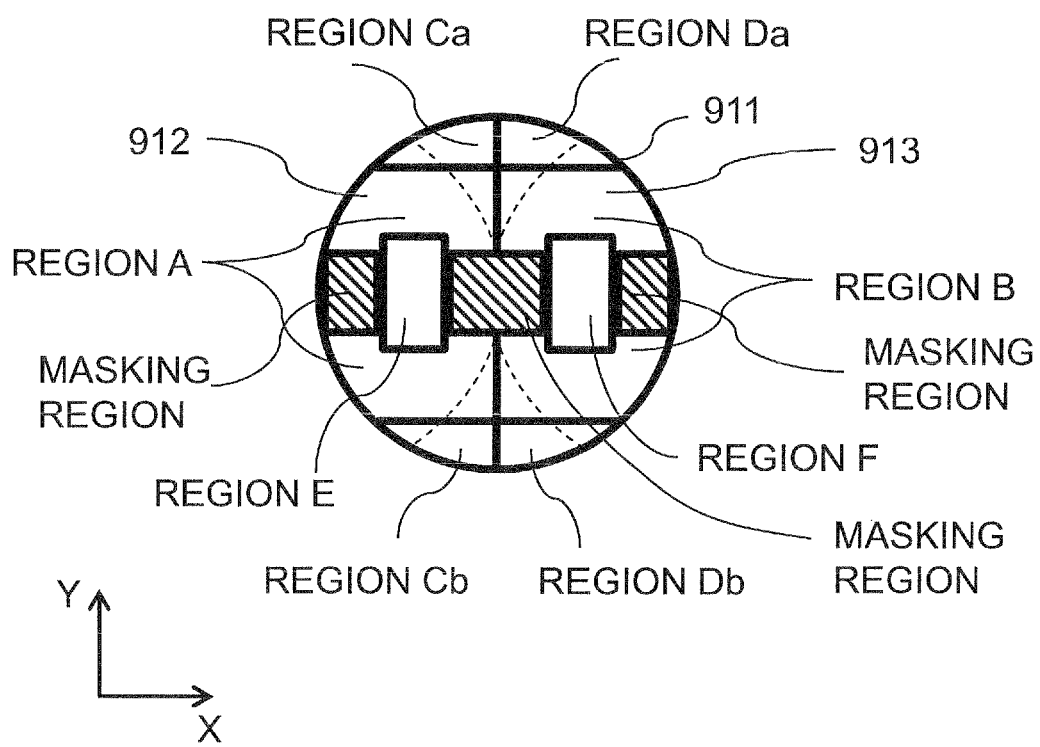
FIG. 20C is a diagram illustrating a mask in the aperture according to another embodiment.

(7) Although each of the above-described embodiments describes the case where the whole of the light in the aperture of the object lens 204 is received by the photo detector 206, part of the light in the aperture may not be received due to a mask and the like. FIGS. 20A to 20C illustrate exemplary configurations where part of the light in the aperture is masked. The shaded portion marked with "masking region" in each figure is a portion not detecting light on the photo detector 206.

Referring to FIG. 20A, part of the regions E and F of FIG. 7B are masked for light. The masking region is a region covering only the 0th-order light 311. A region contributing little to the reduction of the boundary offset may be masked. The masking leads to advantages of increasing a degree of modulation of the tracking error signal, and reducing an influence of the object lens shift.

FIGS. 20B and 20C illustrate exemplary masks for avoiding other layers' stray light in a recording medium 101 including multiple recording layers. For example, a BD-RE disc may include two or three recording layers, and stray light from a layer other than a current layer where the optical pickup 103 is writing or reading the information may be incident on the photo detector 206, thus causing disturbance. In order to reduce the other layers' stray light, masking means may be disposed for partially masking the light in the optical path from the object lens 204 to the photo detector 206. FIGS. 20B and 20C show exemplary masking using the masking means. Thus, part of the light in the aperture may be masked. In addition, the regions A and B may be divided into a plurality of subregions by the masking region, as shown in FIG. 20C.

The masking means may be configured in several manners depending on the purpose. In the simple case of not receiving the light, the sensor array 207 may be omitted in the masking region. In the case of avoiding the other layers' stray light, the masking means may be disposed in the optical path from the object lens 204 to the photo detector 206. In this case, the masking means can be disposed on the diffraction grating in a configuration including, for example, the diffraction grating 1901 of FIG. 19. The masking means in this case may be a masking means for not transmitting light, or a diffraction means for diffracting light to the outside of the light-receiving region of the sensor array 207.

In addition, the masking region may be disposed in the embodiments other than those of FIGS. 20A to 20C.

(8) Although the calculation circuit 110 for the tracking operation is illustrated to be built in the tracking servo circuit 107, the calculation circuit 110 may be disposed outside the tracking servo circuit 107, or may be built in the photo detector 206.

Although the calculation circuit 111 for the focusing operation is illustrated to be built in the focusing servo circuit 106, the calculation circuit 111 may be disposed outside the focusing servo circuit 106, or may be built in the photo detector 206.

In addition, although the astigmatism method is exemplified as a method for detecting the focusing error signal, the present disclosure is not limited thereto, and the Knife-Edge method, the Spot Size Detection (SSD) method, or the like may be used.

(9) Although the optical disc is described as an exemplary recording medium, the generation of the tracking error signal according to the embodiments of the present disclosure is not limited to the recording medium having concentric or spiral tracks, and is also applicable to the recording medium having straight tracks, such as an optical tape.

The recording and playing apparatus according to the present disclosure can more stably keep track of the recording medium than the prior art, when writing and reading information on and from the recording medium. Therefore, the present disclosure is applicable to the recording and playing apparatus, such as the optical disc apparatus and the optical tape apparatus, for optically writing and reading information on and from the recording medium.

The invention claimed is:

1. A recording and playing apparatus for writing and reading information on and from a recording medium having a plurality of tracks disposed at a predetermined pitch, the recording and playing apparatus comprising:
    a light source;
    a photo detector;
    an optical system including a plurality of optical elements, the optical system converging light generated by the light source onto a track of the recording medium, and transmitting 0th-order light, +1st-order diffracted light, and −1st-order diffracted light, which are reflected by the recording medium and then incident to an incident surface of the photo detector;
    a tracking servo mechanism that keeps track of the recording medium; and
    a tracking servo circuit that controls the tracking servo mechanism based on output signals of the photo detector,
    wherein the photo detector includes first to eighth photosensors, each of the first to eighth photosensors generating an output signal depending on incident light,
    wherein the photo detector has a centerline on the incident surface, the centerline passing through an intersection of an optical axis of the optical system and the incident surface, and the centerline extending in a direction corresponding to a tangential direction of the track,
    wherein the first, third, fourth, and seventh photosensors are disposed on one side with respect to the centerline, and the second, fifth, sixth, and eighth photosensors are disposed on another side with respect to the centerline, wherein the third and fourth photosensors are disposed such that the first and seventh photosensors are positioned between the third and fourth photosensors in the direction parallel to the centerline, wherein the fifth and sixth photosensors are disposed such that the second and eighth photosensors are positioned between the fifth and sixth photosensors in the direction parallel to the centerline, wherein, when a center of the 0th-order light coincides with the optical axis, the first photosensor covers a region on which overlapped light of the 0th-order light with the +1st-order diffracted light is incident, the second photosensor covers a region on which overlapped light of the 0th-order light with the −1st-order diffracted light is incident, each of the third to sixth photosensors covers a region on which the 0th-order light is incident, and on which the +1st-order diffracted light and the −1st-order diffracted light are not incident, and each of the seventh and eighth photosensors covers a region on which at least the 0th-order light is incident, and wherein the tracking servo circuit controls the tracking servo mechanism so as to reduce a tracking error signal TE:

$$TE = SA - SB - k1 \times (SCa + SCb - SDa - SDb) - k2 \times (SE - SF),$$

where SA, SB, SCa, SCb, SDa, SDb, SE, and SF denote signal levels of the output signals of the first to eighth photosensors, respectively, and k1 and k2 denote constant coefficients, respectively.

2. The recording and playing apparatus as claimed in claim 1, wherein the tracking servo circuit sets a value of the constant coefficient k1, such that a change in an average level of the tracking error signal TE, the change occurring when a part of the plurality of optical elements is moved in a direction of movement of the tracking servo mechanism, is smaller than a change in a case of k1=0.

3. The recording and playing apparatus as claimed in claim 1, wherein the tracking servo circuit sets a value of the constant coefficient k2, such that a change in an average level of the tracking error signal TE, the change occurring when the light generated by the light source is converged on a boundary track between recorded tracks and unrecorded tracks of the recording medium, is smaller than a change in a case of k2=0.

4. The recording and playing apparatus as claimed in claim 3, wherein the tracking servo circuit sets a different value of the constant coefficient k2 depending on a pitch and a depth of the track of the recording medium.

5. The recording and playing apparatus as claimed in claim 1, wherein, when the center of the 0th-order light coincides with the optical axis, each of the seventh and eighth photosensors covers the region on which the 0th-order light is incident, and on which the +1st-order diffracted light and the −1st-order diffracted light are not incident, and wherein the tracking servo circuit sets a predetermined constant coefficient k2, upon writing and reading information on and from a recording medium satisfying:

$$\sin(\lambda/P) \geq 1.1 \times NA,$$

where $\lambda$ denotes a wavelength of the light generated by the light source, P denotes a pitch of the track, and NA denotes a numerical aperture of an object lens of the optical system.

6. The recording and playing apparatus as claimed in claim 1, wherein, when the center of the 0th-order light coincides with the optical axis, each of the seventh and eighth photosensors covers the region on which the 0th-order light is incident, and on which the +1st-order diffracted light and the −1st-order diffracted light are not incident, and wherein the tracking servo circuit sets k2≈−1, upon writing and reading information on and from a recording medium satisfying:

$$\sin(\lambda/P) < 1.1 \times NA,$$

where $\lambda$ denotes a wavelength of the light generated by the light source, P denotes a pitch of the track, and NA denotes a numerical aperture of an object lens of the optical system.

7. The recording and playing apparatus as claimed in claim 1, wherein, when the center of the 0th-order light coincides with the optical axis, the seventh photosensor covers the region on which overlapped light of the 0th-order light with the +1st-order diffracted light is incident, and the eighth photosensor covers the region on which overlapped light of the 0th-order light with the −1st-order diffracted light is incident, and wherein the tracking servo circuit sets a predetermined constant coefficient k2, upon writing and reading information on and from a recording medium satisfying:

$$\sin(\lambda/P) < NA,$$

where $\lambda$ denotes a wavelength of the light generated by the light source, P denotes a pitch of the track, and NA denotes a numerical aperture of an object lens of the optical system.

8. The recording and playing apparatus as claimed in claim 1, wherein, when the center of the 0th-order light coincides with the optical axis, the seventh photosensor covers the region on which overlapped light of the 0th-order light with the +1st-order diffracted light is incident, and the eighth photosensor covers the region on which overlapped light of the 0th-order light with the −1st-order diffracted light is incident, and wherein the tracking servo circuit sets k2≈−1, upon writing and reading information on and from a recording medium satisfying:

$$\sin(\lambda/P) \geq NA,$$

where $\lambda$ denotes a wavelength of the light generated by the light source, P denotes a pitch of the track, and NA denotes a numerical aperture of an object lens of the optical system.

9. The recording and playing apparatus as claimed in claim 1, wherein, when the center of the 0th-order light coincides with the optical axis, the seventh photosensor covers a subregion on which overlapped light of the 0th-order light with the +1st-order diffracted light is incident, and a subregion on which the 0th-order light is incident, and on which the +1st-order diffracted light and the −1st-order diffracted light are not incident, and the eighth photosensor covers a subregion on which overlapped light of the 0th-order light with the −1st-order diffracted light is incident, and a subregion on which the 0th-order light is incident, and on which the +1st-order diffracted light and the −1st-order diffracted light are not incident, and wherein the tracking servo circuit sets a predetermined constant coefficient k2, upon writing and reading information on and from a recording medium satisfying:

$$0.9 \times NA \leq \sin(\lambda/P) < 1.2 \times NA,$$

where $\lambda$ denotes a wavelength of the light generated by the light source, P denotes a pitch of the track, and NA denotes a numerical aperture of an object lens of the optical system.

10. The recording and playing apparatus as claimed in claim 1,
wherein the seventh photosensor covers a plurality of subregions, each of the subregions generates an output signal depending on incident light,
wherein the eighth photosensor covers a plurality of subregions, each of the subregions generates an output signal depending on incident light, and
wherein the tracking servo circuit controls the tracking servo mechanism so as to reduce a tracking error signal TE:

$$TE = SA - SB - k1 \times (SCa + SCb - SDa - SDb) - k2a \times (SEa - SFa) - k2b \times (SEb - SFb) - \ldots - k2n \times (SEn - SFn),$$

where $SEa, SEb, \ldots,$ and $SEn$ denote signal levels of a plurality of output signals corresponding to the plurality of subregions of the seventh photosensor, respectively, $SFa, SFb, \ldots,$ and $SFn$ denote signal levels of a plurality of output signals corresponding to the plurality of subregions of the eighth photosensor, respectively, and $k2a, k2b, \ldots,$ and $k2n$ denote constant coefficients, respectively.

11. The recording and playing apparatus as claimed in claim 1, further comprising a diffraction grating that spatially separates light incident on the first to eighth photosensors.

12. The recording and playing apparatus as claimed in claim 11, further comprising a masking region on a part of the diffraction grating.

13. A recording and playing apparatus for writing and reading information on and from a recording medium having a plurality of tracks disposed at a predetermined pitch, the recording and playing apparatus comprising:
a light source;
a photo detector;
an optical system including a plurality of optical elements, the optical system converging light generated by the light source onto a track of the recording medium, and transmitting 0th-order light, +1st-order diffracted light, and −1st-order diffracted light, which are reflected by the recording medium and then incident to an incident surface of the photo detector;
a tracking servo mechanism that keeps track of the recording medium; and
a tracking servo circuit that controls the tracking servo mechanism based on output signals of the photo detector,
wherein the photo detector includes first to eighth photosensors, each of the first to eighth photosensors generating an output signal depending on incident light,
wherein the photo detector has a centerline on the incident surface, the centerline passing through an intersection of an optical axis of the optical system and the incident surface, and the centerline extending in a direction corresponding to a tangential direction of the track,
wherein the first, third, fourth, and seventh photosensors are disposed on one side with respect to the centerline, and the second, fifth, sixth, and eighth photosensors are disposed on another side with respect to the centerline,
wherein the third and fourth photosensors are disposed such that the first and seventh photosensors are positioned between the third and fourth photosensors in the direction parallel to the centerline,
wherein the fifth and sixth photosensors are disposed such that the second and eighth photosensors are positioned between the fifth and sixth photosensors in the direction parallel to the centerline,
wherein, when a center of the 0th-order light coincides with the optical axis, the first photosensor covers a region on which overlapped light of the 0th-order light with the +1st-order diffracted light is incident, the second photosensor covers a region on which overlapped light of the 0th-order light with the −1st-order diffracted light is incident, each of the third to sixth photosensors covers a region on which the 0th-order light is incident, and on which the +1st-order diffracted light and the −1st-order diffracted light are not incident, and each of the seventh and eighth photosensors covers a region on which at least the 0th-order light is incident,
wherein the seventh photosensor covers a plurality of subregions, each of the subregions generates an output signal depending on incident light,
wherein the eighth photosensor covers a plurality of subregions, each of the subregions generates an output signal depending on incident light, and
wherein the tracking servo circuit selects at least one of a plurality of output signals corresponding to the plurality of subregions of the seventh photosensor, and selects at least one of a plurality of output signals corresponding to the plurality of subregions of the eighth photosensor, depending on at least one of a pitch of the track, a depth of the track, and recording film characteristics of the recording medium.

14. A recording and playing apparatus for writing and reading information on and from a recording medium having a plurality of tracks disposed at a predetermined pitch, the recording and playing apparatus comprising:
a light source;
a photo detector;
an optical system including a plurality of optical elements, the optical system converging light generated by the light source onto a track of the recording medium, and transmitting 0th-order light, +1st-order diffracted light, and −1st-order diffracted light, which are reflected by the recording medium and then incident to an incident surface of the photo detector;
a tracking servo mechanism that keeps track of the recording medium; and
a tracking servo circuit that controls the tracking servo mechanism based on output signals of the photo detector,
wherein the photo detector includes first to eighth photosensors, each of the first to eighth photosensors generating an output signal depending on incident light,
wherein the photo detector has a centerline on the incident surface, the centerline passing through an intersection of an optical axis of the optical system and the incident surface, and the centerline extending in a direction corresponding to a tangential direction of the track, wherein the first, third, fourth, and seventh photosensors are disposed on one side with respect to the centerline, and the second, fifth, sixth, and eighth photosensors are disposed on another side with respect to the centerline, wherein the third and fourth photosensors are disposed such that the first and seventh photosensors are positioned between the third and fourth photosensors in the direction parallel to the centerline, wherein the fifth and sixth photosensors are disposed such that the second and eighth photosensors are positioned between the fifth and sixth photosensors in the direction parallel to the centerline, wherein, when a center of the 0th-order light coincides with the optical axis, the first photosensor covers a region on which overlapped light of the 0th-order light with the +1st-order diffracted light is incident, the second photosensor covers a region on which overlapped light of the 0th-order light with the −1st-order diffracted light is incident, each of the third to sixth photosensors covers a region on which the 0th-order light is incident, and on which the +1st-order diffracted light and the −1st-order diffracted light are not incident, and each of the seventh and eighth photosensors covers a region on which at least the 0th-order light is incident, wherein the first photosensor covers a plurality of subregions, each of the subregions generates an output signal depending on incident light, wherein the second photosensor covers a plurality of subregions, each of the subregions generates an output signal depending on incident light, and wherein the tracking servo circuit selects at least one of a plurality of output signals corresponding to the plurality of subregions of the first photosensor, and selects at least one of a plurality of output signals corresponding to the plurality of subregions of the second photosensor, depending on at least one of a pitch of the track, a depth of the track, and recording film characteristics of the recording medium.

* * * * *